(12) United States Patent
Ito et al.

(10) Patent No.: US 8,223,972 B2
(45) Date of Patent: Jul. 17, 2012

(54) METHOD AND DEVICE FOR SPEEDING UP KEY USE IN KEY MANAGEMENT SOFTWARE WITH TREE STRUCTURE

(75) Inventors: Takayuki Ito, Osaka (JP); Hideki Matsushima, Osaka (JP); Hisashi Takayama, Osaka (JP); Tomoyuki Haga, Nara (JP); Yuichi Futa, Osaka (JP); Manabu Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 1057 days.

(21) Appl. No.: 12/146,255

(22) Filed: Jun. 25, 2008

(65) Prior Publication Data

US 2009/0046862 A1    Feb. 19, 2009

(30) Foreign Application Priority Data

Jun. 25, 2007 (JP) ................................ 2007-166318

(51) Int. Cl.
*H04L 9/00* (2006.01)
(52) U.S. Cl. ............. 380/277; 380/278; 380/44; 380/45
(58) Field of Classification Search .............. 380/44–45, 380/277–278
See application file for complete search history.

(56) References Cited

U.S. PATENT DOCUMENTS

| | | | |
|---|---|---|---|
| 7,224,804 B2 | 5/2007 | Ishiguro et al. | |
| 7,490,101 B2 * | 2/2009 | Basso et al. | 1/1 |
| 7,610,276 B2 * | 10/2009 | Yomtobian | 1/1 |
| 7,677,460 B2 * | 3/2010 | Le Crom et al. | 235/492 |
| 7,702,630 B2 * | 4/2010 | Basso et al. | 707/769 |
| 2003/0105956 A1 * | 6/2003 | Ishiguro et al. | 713/158 |
| 2004/0136533 A1 * | 7/2004 | Takagaki et al. | 380/255 |
| 2008/0137864 A1 * | 6/2008 | Jin et al. | 380/277 |

FOREIGN PATENT DOCUMENTS

JP    2002-152187    5/2002

OTHER PUBLICATIONS

"TCG Specification Architecture Overview Specification Revision 1.3", Mar. 28, 2007.
Barker et al. "NIST SP 800-57 Recommendation for Key Management, Part 1", Mar. 2007.

* cited by examiner

*Primary Examiner* — Carl Colin
*Assistant Examiner* — Ali Shayanfar
(74) *Attorney, Agent, or Firm* — Wenderoth, Lind & Ponack, L.L.P.

(57) ABSTRACT

In the key management software having a key database with a tree structure, a high-speed data encryption/decryption process is achieved by changing the tree structure without reducing the security strength when deleting or adding a key from/to the tree structure. The key management software having the key database with the tree structure, when deleting or adding a key from/to the tree structure, refers to the encryption strength comparison table and the process time comparison table to change the tree structure without reducing the security strength. This reduces the number of times an encrypted key is loaded onto the encryption/decryption processing device during the data encryption/decryption process, thus achieving a high-speed data encryption/decryption.

13 Claims, 20 Drawing Sheets

| | Node information structure 120 | |
|---|---|---|
| 121 | Encryption type | RSA cryptography |
| 122 | Key length | 2048 bits |
| 123 | Key | 0xFF 0xFE … 0x00 |
| 124 | Parent node identifier | Intermediate node number |
| 125 | Password | 0xFF 0xFE … 0x00 |
| 126 | Other attached information | Flag settings done |

FIG.5

Encryption strength comparison table 170

| Encryption algorithm | RSA | Elliptic curve | AES | 3DES |
|---|---|---|---|---|
| Key length for same security strength-1 | 1024 bits | 160 bits | 80 bits | ...bits |
| Key length for same security strength-2 | 2048 bits | 224 bits | 112 bits | ...bits |
| Key length for same security strength-3 | 3072 bits | 256 bits | 128 bits | ...bits |
| Key length for same security strength-4 | 7680 bits | 384 bits | 256 bits | ...bits |

Process time comparison table 180

| Encryption/decryption processing device type | Type1 | | | |
|---|---|---|---|---|
| Process performance comparison among encryption algorithms | AES | 3DES | RSA | Elliptic curve |
| | 1 | 2 | 3 | 4 |

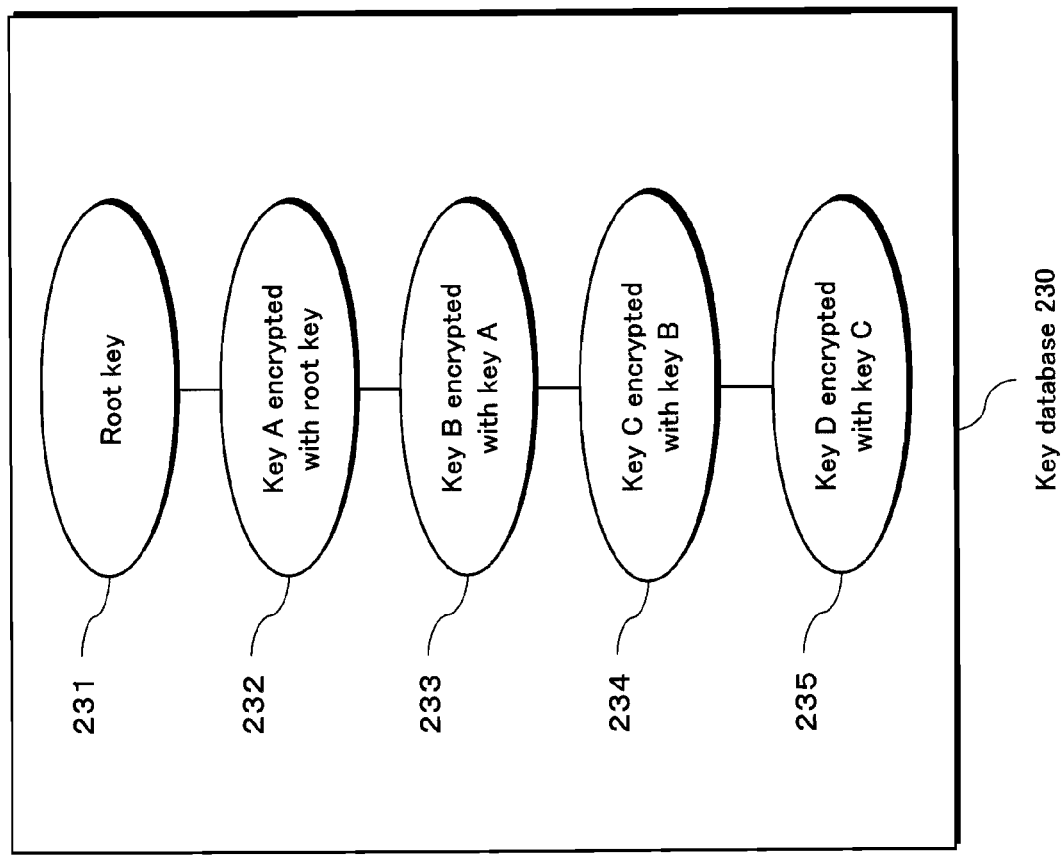

METHOD AND DEVICE FOR SPEEDING UP KEY USE IN KEY MANAGEMENT SOFTWARE WITH TREE STRUCTURE

This application is based on an application No. 2007-166318 filed in Japan, the content of which is hereby incorporated by reference.

BACKGROUND OF THE INVENTION (1) Field of the Invention

The present invention relates to a method for speeding up an encryption/decryption process in the key management software that manages, using a key database with the tree structure, keys to be used for the encryption/decryption, in a device or the like that encrypts and/or decrypts files and data.

(2) Description of the Related Art

An issue of concern in recent years is that data like personal information is stolen from data processing devices such as personal computers and mobile phones.

Such a theft of data may be conducted by a malicious program such as a computer virus. The malicious program operates in an unauthorized manner within a target data processing device, making use of a malfunction of the program or the like having occurred therein. The malicious program may read data from the storage device of the personal computer or mobile phone. The malicious program may also send the read data to an attacker or the like via a network.

One of technologies for preventing such a theft of data is data encryption/decryption. The data encryption/decryption includes a data encryption and a data decryption. In the data encryption, data is encrypted by an encryption algorithm using a secret key. Here, the encryption algorithm to be used differs depending on the cryptography actually adopted. For example, the public key cryptography such as the RSA cryptography or the common key cryptography such as the AES cryptography may be adopted. In the data decryption, the encrypted data is decrypted. Here, the encrypted data is not correctly decrypted unless a key, which corresponds to a key used in the encryption, is used.

With use of the data encryption/decryption, even if a malicious program reads data from a data processing device and sends it to an attacker, the attacker cannot decrypt the received data when the attacker does not know the key. However, a problem with the data encryption/decryption is that, if the secret key is exposed, the attacker can decrypt the encrypted data and thus can steal the correctly decrypted information.

The Trusted Computing Group (TCG), in view of the above-mentioned problem, published a specification (see Non-Patent Document 1 identified below) for protecting the keys used in the data encryption/decryption.

In the following, the data encryption/decryption disclosed in the Non-Patent Document 1 as "Protected Storage" will be described with reference to FIGS. 15 through 18.

FIG. 15 shows a key database that is managed by the key management software for achieving the data encryption/decryption.

A key database 200 manages the keys in the tree structure. The tree structure of the key database 200 includes: a node 201 of the root key; a node 202 of a key A encrypted with the root key; and a node 203 of a key B encrypted with the root key.

The node 202 stores the key A encrypted with the root key. The key A is used to encrypt and/or decrypt data that is not illustrated.

The node 203 stores the key B encrypted with the root key. The key B is used to encrypt and/or decrypt data that is not illustrated.

FIG. 16 shows the structure of an encryption/decryption processing device that is used by the key management software to load keys and encrypt and/or decrypt data.

As shown in FIG. 16, an encryption/decryption processing device 210 includes a nonvolatile memory 211, an encryption/decryption engine 212, and a key storage unit 213.

The encryption/decryption processing device 210 has been made tamper-resistant so that process data stored therein cannot be stolen or tampered with from outside thereof.

The nonvolatile memory 211 is a nonvolatile storage device, meaning that once data is stored therein, the data is retained even if the power supply from an external power source is stopped. The nonvolatile memory 211 stores a root key 214. The root key 214 is a private key for use in the public key cryptography or a common key for use in the common key cryptography.

The encryption/decryption engine 212 is a device that decrypts encrypted keys, encrypts keys, decrypts encrypted data, and encrypts data.

The key storage unit 213 is a device storing the key that is used by the encryption/decryption engine 212.

FIG. 17 shows the flow of the process in which the key management software loads a key onto the encryption/decryption processing device 210.

FIG. 18 shows the flow of the process in which the key management software causes the encryption/decryption processing device 210 to encrypt and/or decrypt data.

The following will describe the process in which the key A shown in FIG. 15 is loaded onto the encryption/decryption processing device, and the process in which the encryption/decryption is achieved, with reference to FIGS. 17 and 18.

<Key Load Process>

The key management software is requested to load the key A, from an application that is not illustrated (S200).

The key management software obtains, from the key database 200, the node 202 that corresponds to the specified key, and loads the key onto the encryption/decryption processing device 210 (S201).

The encryption/decryption processing device 210 causes the encryption/decryption engine 212 to decrypt the key A, which has been encrypted with the root key, using the root key 214, and store the decrypted key into the key storage unit 213 (S202).

The key management software ends the key load process when it receives, from the encryption/decryption processing device 210, a notification that the key loading has been completed (S203).

<Data Encryption/Decryption Process>

After the key A is stored into the key storage unit 213 as described above, the key management software is requested to encrypt or decrypt the data, from an application that is not illustrated (S210).

The key management software inputs, into the encryption/decryption processing device 210, the data input from the application, and requests the encryption/decryption processing device 210 to encrypt or decrypt the data using the key A (S211).

The encryption/decryption processing device 210 causes the encryption/decryption engine 212 to encrypt or decrypt the input data using the key A stored in the key storage unit 213, and outputs the data that has been encrypted or decrypted (S212).

The key management software notifies the application of the data output from the encryption/decryption processing device 210, and ends the data encryption/decryption process (S213).

With the above-described structure where the key database and the encryption/decryption processing device are used, the plaintext key can be used while it is always stored in the tamper-resistant encryption/decryption processing device. This prevents the plaintext key from being stolen.

Further, when registering a key with the key database 200, the user or application that is to perform the data encryption/decryption may set a password into the node 202 of the key A encrypted with the root key or into the node 203 of the key B encrypted with the root key, in the structure shown in FIG. 15. In this case, the user or application performs the data encryption/decryption by inputting a password, which corresponds to the node storing a key to be used, into the key management software.

The Patent Document 1 identified below discloses a technology for achieving deletion of nodes from the tree structure in the data management. This technology will be briefly described with reference to FIG. 19.

FIG. 19 shows a terminal management database 220 used for managing terminals which may include, for example, a DVD playback device.

The terminal management database 220 is a tree-structure database composed of: a root 221, an intermediate node A 222, an intermediate node B 223, a leaf C 224, an intermediate node D 225, a leaf E 226, a leaf F 227, and a leaf G 228. Of these, the root is a node that has no parent node, and is positioned at the top of the tree structure. The intermediate node is a node that has a parent node and child node(s). The leaf is a node that has merely a parent node.

In the terminal management database 220, the leaf C 224, the leaf E 226, the leaf F 227, and the leaf G 228 store information corresponding to the terminals.

When terminals respectively corresponding to the leaf F 227 and the leaf G 228 are to be revoked, the leaf D 225 is deleted from the terminal management database 220. This makes it possible to delete the leaf F 227 and the leaf G 228 from the terminal management database 220 all at once.

According to the method of the Non-Patent Document 1, the key database of the tree structure is used so that the data encryption/decryption can be performed by protecting a plaintext key.

However, this method has a problem that as the number of intermediate nodes that exist on a path from the root to the leaves increases (hereinafter, the number of intermediate nodes is referred to as "tree-structure depth"), the data encryption/decryption performance deteriorates.

The problem will be described briefly with reference to FIG. 20. FIG. 20 shows a key database 230. The key database 230 is composed of: a node 231 storing the root key; a node 232 storing a key A encrypted with the root key; a node 233 storing a key B encrypted with the key A; a node 234 storing a key C encrypted with the key B; and a node 235 storing a key D encrypted with the key C.

With this structure, to obtain the key D from the key database 230, the key load process should be performed four times in total: the first load process in which key A is obtained by decrypting encrypted key A, which has been encrypted using the root key, using the root key; the second load process in which key B is obtained by decrypting encrypted key B, which has been encrypted using the key A, using the key A; the third load process in which key C is obtained by decrypting encrypted key C, which has been encrypted using the key B, using the key B; and the fourth load process in which key D is obtained by decrypting encrypted key D, which has been encrypted using the key C, using the key C.

Further, although Patent Document 1 discloses the method of deleting leaves efficiently, the technology has problem that, when an intermediate node is deleted, all the leaves connected with the deleted node are also deleted.

It is therefore an object of the present invention to provide a method for speeding up an encryption/decryption process in the key management software that manages, using a key database with the tree structure, keys to be used for the encryption/decryption, in a device or the like that encrypts and/or decrypts files and data.

Patent Document 1: Japanese Patent Application Publication No. 2002-152187

Non-Patent Document 1: *TCG Specification Architecture Overview, Specification, Revision* 1.3, 28 Mar. 2007.

SUMMARY OF THE INVENTION

One aspect of the present invention is a key management device comprising: a database storage unit storing a key database for managing, in a tree structure, pairs of type information and a key, the type information indicating a type of an encryption algorithm, the key being used in an encryption by the encryption algorithm in a same pair; a strength information storage unit storing strength information that indicates strengths of encryptions that are each performed using a key by an encryption algorithm, the strength information being composed of type information and key information, each piece of type information indicating a type of encryption algorithm, and each piece of key information relating to a key used for encryption, the strength information being structured such that each of the strengths of encryptions corresponds to a piece of type information and a piece of key information; a restructuring unit operable to, upon receiving an instruction for restructuring the key database, restructure the key database by positionally changing a change target node that is a node to be changed by the restructuring, wherein a pair of type information and a key assigned to any node in the tree structure corresponds to an encryption algorithm that is used to encrypt and decrypt a key assigned to a child node of said any node, a key assigned to any node except for a root of the tree structure has been encrypted using a key and an encryption algorithm of a type that have been assigned to a parent node of said any node, and is stored in the key database in an encrypted state, and the restructuring unit includes: a searching sub-unit operable to, by referring to the strength information, search for, as a candidate node, a node to which has been assigned a pair of type information and a key that correspond to an encryption algorithm having a highest encryption strength among nodes on a path from the root of the tree structure to the change target node; a node obtaining sub-unit operable to, by referring to the strength information, obtain, as a substitute candidate node, a node which has a same parent node as the candidate node, and to which has been assigned a pair of type information and a key having an encryption strength equal to or higher than the encryption strength of the candidate node; a restructuring sub-unit operable to restructure the tree structure so that the change target node becomes a child node of the substitute candidate node; and a re-encrypting sub-unit operable to decrypt a key assigned to the change target node, using a key and an encryption algorithm indicated by type information assigned to a node that is a parent node of the change target node before the restructuring is performed, and to re-encrypt the decrypted key using a key and an encryption algorithm indicated by type information assigned to a substitute candidate node that is a parent node of the change target node after the restructuring is performed.

With the above-described structure, the data processing device can change the tree structure without reducing the security strength.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5 shows an encryption strength comparison table in Embodiment 1 of the present invention;

FIG. 6 shows a process time comparison table in Embodiment 1 of the present invention;

FIG. 20 is a reference drawing showing one example of a key database.

DESCRIPTION OF THE PREFERRED EMBODIMENTS

Figure 1:
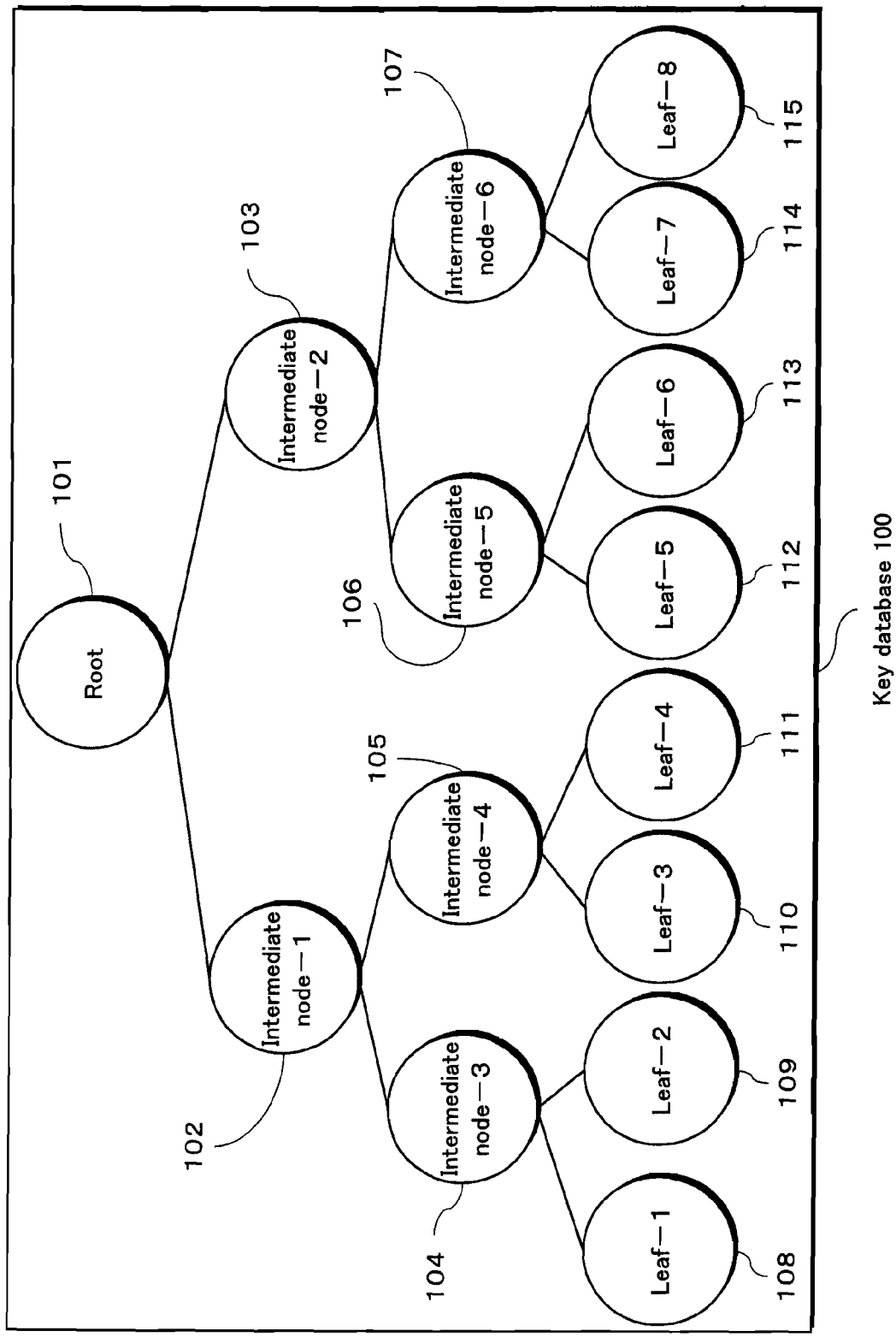
FIG. 1 shows a key database in Embodiment 1 of the present invention.

One aspect of the present invention is a key management device comprising: a database storage unit storing a key database for managing, in a tree structure, pairs of type information and a key, the type information indicating a type of an encryption algorithm, the key being used in an encryption by the encryption algorithm in a same pair; a strength information storage unit storing strength information that indicates strengths of encryptions that are each performed using a key by an encryption algorithm, the strength information being composed of type information and key information, each piece of type information indicating a type of encryption algorithm, and each piece of key information relating to a key used for encryption, the strength information being structured such that each of the strengths of encryptions corresponds to a piece of type information and a piece of key information; a restructuring unit operable to, upon receiving an instruction for restructuring the key database, restructure the key database by positionally changing a change target node that is a node to be changed by the restructuring, wherein a pair of type information and a key assigned to any node in the tree structure corresponds to an encryption algorithm that is used to encrypt and decrypt a key assigned to a child node of said any node, a key assigned to any node except for a root of the tree structure has been encrypted using a key and an encryption algorithm of a type that have been assigned to a parent node of said any node, and is stored in the key database in an encrypted state, and the restructuring unit includes: a searching sub-unit operable to, by referring to the strength information, search for, as a candidate node, a node to which has been assigned a pair of type information and a key that correspond to an encryption algorithm having a highest encryption strength among nodes on a path from the root of the tree structure to the change target node; a node obtaining sub-unit operable to, by referring to the strength information, obtain, as a substitute candidate node, a node which has a same parent node as the candidate node, and to which has been assigned a pair of type information and a key having an encryption strength equal to or higher than the encryption strength of the candidate node; a restructuring sub-unit operable to restructure the tree structure so that the change target node becomes a child node of the substitute candidate node; and a re-encrypting sub-unit operable to decrypt a key assigned to the change target node, using a key and an encryption algorithm indicated by type information assigned to a node that is a parent node of the change target node before the restructuring is performed and to re-encrypt the decrypted key using a key and an encryption algorithm indicated by type information assigned to a substitute candidate node that is a parent node of the change target node after the restructuring is performed.

The above-stated key management device may further comprise a process time storage unit storing process time information that indicates process times of encryptions respectively by the plurality of encryption algorithms using the corresponding keys, wherein the node obtaining sub-unit refers to the process time information and further obtains, as a substitute candidate node, a node to which has been assigned a pair of type information and a key that corresponds to an encryption algorithm having a shorter process time than a process time of an encryption performed by using a key and an encryption algorithm indicated by type information assigned to the candidate node.

With the above-described structure, the data processing device can change encryption algorithms assigned to nodes on a path from the root to the leaves, to encryption algorithms that can be executed by the encryption/decryption processing device at high speeds, without reducing the security strength.

In the above-stated key management device, the node obtaining sub-unit may refer to the strength information and the process time information, determine a pair of a key and type information that indicates an encryption algorithm having (i) an encryption strength equal to or higher than an encryption strength of the encryption performed by using the key and the encryption algorithm indicated by the type information assigned to the candidate node and (ii) a shorter process time than the process time of the encryption performed by using the key and the encryption algorithm indicated by the type information assigned to the candidate node, newly generates a node, assigns the determined pair of a key and type information to the newly generated node, and determines the newly generated node as the substitute candidate node, the restructuring sub-unit adds the substitute candidate node as a child node of a node that is a parent node of the candidate node, and restructures the tree structure so that the change target node becomes a child node of the substitute candidate node, and the re-encrypting sub-unit encrypts a key assigned to the substitute candidate node, using a key and an encryption algorithm indicated by type information assigned to a node that is a parent node of the candidate node.

With the above-described structure, the data processing device can perform the data encryption/decryption while protecting the keys from being stolen.

In the above-stated key management device, the strength information storage unit may store an encryption strength comparison table in which key lengths of keys used in the encryptions are used as the key information, and the encryption strength comparison table includes, as the strength information, a plurality of sets of key lengths with which the plurality of encryption algorithms have a same security strength, respectively.

With the above-described structure, the data processing device can change the tree structure without reducing the security strength by using the encryption strength comparison table.

In the above-stated key management device, the instruction for restructuring received by the restructuring unit may be an instruction for deleting a node from the tree structure, and the change target node is a child node of the node specified by the node delete instruction.

With the above-described structure, the data processing device can add keys flexibly by changing part of the nodes constituting the tree structure.

In the above-stated key management device, each node in the tree structure may be assigned with a password that is required to use a corresponding key, and the restructuring unit further includes: a password obtaining sub-unit operable to obtain a password that is longest among passwords respectively assigned to nodes present on a path from the root of the tree structure to the change target node; and an assigning sub-unit operable to assign the obtained password to the change target node.

With the above-described structure, the data processing device can allow a predetermined user or application to use a key, with passwords utilized for protection.

The above-stated key management device may further comprise: a database storage unit storing a key database for managing, in a tree structure, pairs of type information and a key, the type information indicating a type of an encryption algorithm, the key being used in an encryption by the encryption algorithm; a strength information storage unit storing strength information that indicates strengths of encryptions that are each performed using a key by an encryption algorithm, the strength information being composed of type information and key information, each piece of type information indicating a type of encryption algorithm, and each piece of key information relating to a key used for encryption, the strength information being structured such that each of the strengths of encryptions corresponds to a piece of type information and a piece of key information; and a restructuring unit operable to, upon receiving an instruction for restructuring the key database, restructure the key database by positionally changing a change target node that is a node being a target of change by the restructuring, wherein a pair of type information and a key assigned to any node in the tree structure corresponds to an encryption algorithm that is used for encrypting and decrypting a key assigned to a child node of said any node, a key assigned to any node except for a root of the tree structure has been encrypted using a key and an encryption algorithm of a type that have been assigned to a parent node of said any node, and is stored in the key database in an encrypted state, and the restructuring unit includes: a searching sub-unit operable to, by referring to the strength information, search for, as a candidate node, a node to which has been assigned a pair of type information and a key that correspond to an encryption algorithm having a highest encryption strength on a path from the root of the tree structure to the change target node; a restructuring sub-unit operable to, by referring to the strength information, restructure the tree structure so that the change target node becomes a child node of the candidate node; and a re-encrypting sub-unit operable to decrypt a key assigned to the change target node, using a key and an encryption algorithm indicated by type information assigned to a node that is a parent node of the change target node before the restructuring is performed, and to re-encrypt the decrypted key using a key and an encryption algorithm indicated by type information assigned to a candidate node that is a parent node of the change target node after the restructuring is performed.

With the above-described structure, the data processing device can change the tree structure without reducing the security strength.

The following describes a preferred embodiment of the present invention, with reference to the attached drawings.

Embodiment 1

FIG. 1 shows a key database in Embodiment 1 of the present invention.

As shown in FIG. 1, a key database 100 includes a root 101, an intermediate node-1 102, an intermediate node-2 103, an intermediate node-3 104, an intermediate node-4 105, an intermediate node-5 106, an intermediate node-6 107, a leaf-1 108, a leaf-2 109, a leaf-3 110, a leaf-4 111, a leaf-5 112, a leaf-6 113, a leaf-7 114, and a leaf-8 115. Of these, the root is a node that has no parent node, and is positioned at the top of the tree structure. The intermediate node is a node that has a parent node and child node(s). The leaf is a node that has merely a parent node.

The root 101 is a parent node of the intermediate node-1 102 and the intermediate node-2 103. The intermediate node-1 102 is a parent node of the intermediate node-3 104 and the intermediate node-4 105. The intermediate node-2 103 is a parent node of the intermediate node-5 106 and the intermediate node-6 107. The intermediate node-3 104 is a parent node of the leaf-1 108 and the leaf-2 109. The intermediate node-4 105 is a parent node of the leaf-3 110 and the leaf-4 111. The intermediate node-5 106 is a parent node of the leaf-5 112 and the leaf-6 113. The intermediate node-6 107 is a parent node of the leaf-7 114 and the leaf-8 115.

The root and the intermediate nodes shown in FIG. 1 are assigned with keys that are used to protect keys stored in the child nodes. Also, the leaves are assigned with keys that are used to encrypt/decrypt data.

For the root, intermediate nodes and leaves shown in FIG. 1, a node information structure is used for the management of the keys.

Figure 2:
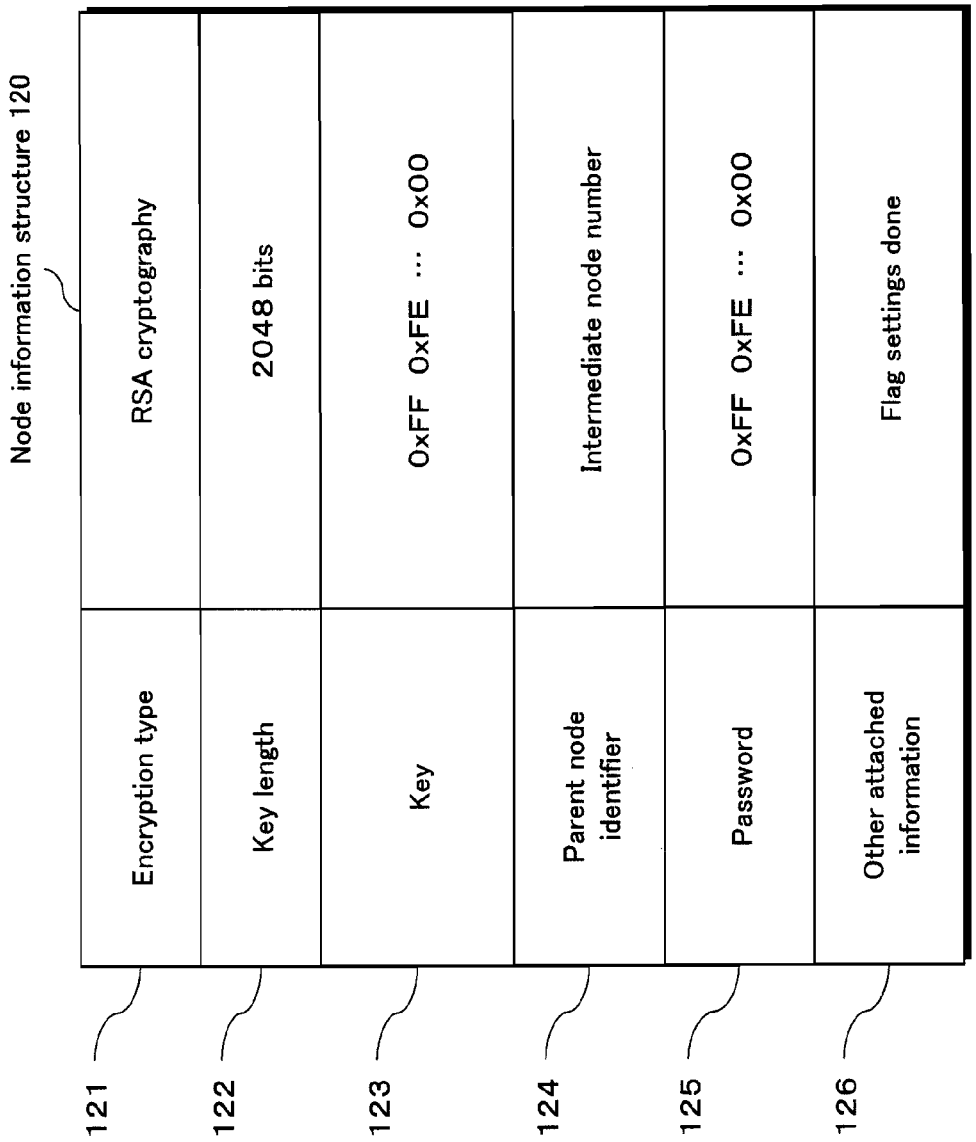
FIG. 2 is a block diagram showing the data structure of a node information structure in Embodiment 1 of the present invention.

FIG. 2 shows the data structure of a node information structure 120.

The node information structure 120 includes fields of: encryption type 121; key length 122; key 123; parent node identifier 124; password 125; and other attached information 126.

The encryption type 121 field stores a name or an identifier of an encryption algorithm used in the public key cryptography such as the RSA cryptography or the elliptic curve cryptography, or used in the common key cryptography such as the AES cryptography or the 3DES cryptography.

The key length 122 field stores information of the length of a key that is used when encryption/decryption is performed using the encryption algorithm specified by the encryption type 121. The value stored in the key length 122 field may be a numeral indicating a bit length or a byte length, or may be an identifier corresponding to a predetermined key length.

The key 123 field stores an encrypted key generated by encrypting a key that is used to perform an encryption/decryption using the encryption algorithm specified by the encryption type 121. The key 123 field may store the key value itself. However, the key corresponding to the root is not stored in the key 123 field of the node information structure. The storage location of the key corresponding to the root will be described later. The key to be stored into the key 123 field is encrypted by using the key of the intermediate node specified by the parent node identifier 124 or using the key of the root (key of parent node of each node).

The parent node identifier 124 field stores an identifier of a parent node of a node to which the node information structure 120 is assigned, in the tree structure shown in FIG. 1. The parent node identifier 124 field may store a value indicating the position of the parent node. Also, the value stored in the parent node identifier 124 field may be a predetermined identifier or a dynamically generated identifier.

The password 125 field stores a password assigned to each node. The value stored in the password 125 field may be an input password. Further, an identifier of the input password may be generated using a, one direction function such as the SHA1 operation, and the generated identifier may be stored in the password 125 field. Also, the value stored in the password 125 field is registered when a not-described user or application inputs, into the key management software, a password that corresponds to a key to be registered. The password 125 field is referred to when the password stored therein is compared with a password input by a not-described user or application when a data encryption/decryption is performed.

The other attached information 126 field stores other information necessary for each node.

<Hardware Structure in Embodiment 1>

Figure 3:
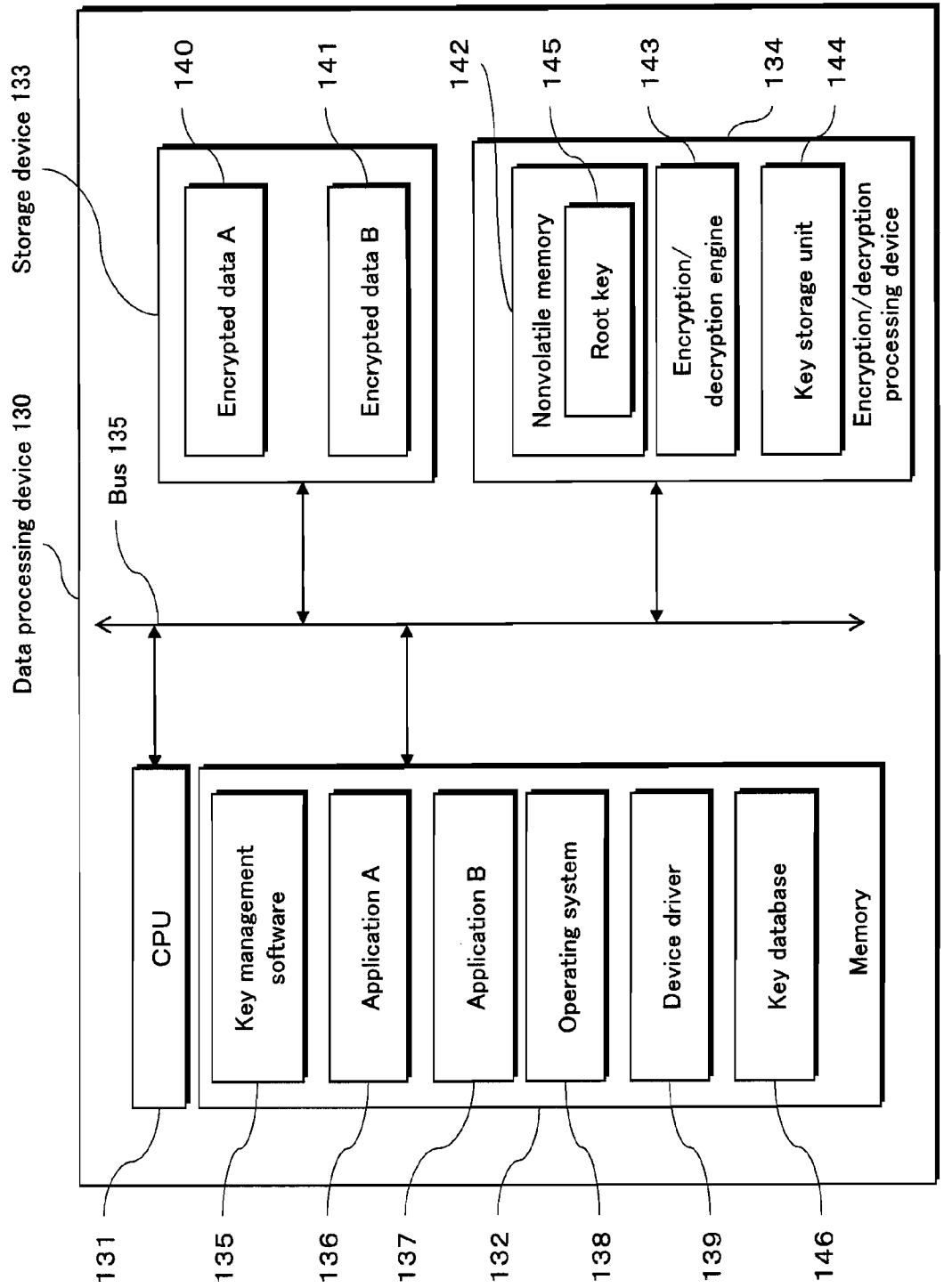
FIG. 3 shows the hardware structure in Embodiment 1 of the present invention.

FIG. 3 shows the hardware structure of a data processing device 130 that performs a data encryption/decryption by using the key database shown in FIG. 1 and the node information structure shown in FIG. 2.

As shown in FIG. 3, the data processing device 130 includes a CPU 131, a memory 132, a storage device 133, and an encryption/decryption processing device 134. The CPU 131, memory 132, storage device 133, and encryption/decryption processing device 134 are connected with each other via a bus 135.

The data processing device 130 further includes elements such as an input/output unit that are not shown in FIG. 3, but description thereof is omitted since they are not essential to the present invention.

In the following, the structural elements of the data processing device 130 will be described.

<Hardware Structural Elements of Data Processing Device>

The CPU 131 controls the whole operation of the data processing device 130 by executing instruction codes contained in the program or the like stored in the memory 132.

The memory 132 is a volatile memory storing a key management software 135, an application A 136, an application B 137, an operating system 138, a device driver 139, and a key database 146. Here, the key database 146 is a database for managing the keys used by the data processing device 130 in encryption/decryption, in the data structure shown in FIG. 1.

The storage device 133 stores encrypted data A 140 and encrypted data B 141 that are used by the application A 136, the application B 137 and others.

The encryption/decryption processing device 134 includes a nonvolatile memory 142, an encryption/decryption engine 143, and a key storage unit 144.

The encryption/decryption processing device 134 has been made tamper-resistant so that process data stored therein cannot be stolen or tampered with from outside thereof.

<Structural Elements of Encryption/Decryption Processing Device>

The nonvolatile memory 142 is a nonvolatile storage device, meaning that once data is stored therein, the data is retained even if the power supply from an external power source is stopped. The nonvolatile memory 142 stores a root key 145. The root key 145 is a private key for use in the public key cryptography or a common key for use in the common key cryptography. The root key 145 corresponds to the root 101 in the key database 100 shown in FIG. 1. Since the root key 145 is used when a key of any of the other nodes is decrypted, the root key 145 is managed by the tamper-resistant encryption/decryption processing device, not by the key database 146 included in the memory. Here, if all the keys included in the key database 146 were to be recorded in a tamper-resistant area, the tamper-resistant area should have a large recording capacity. Thus, only the root key, which is necessary when a key of any of the other nodes is decrypted, is protected by a tamper-resistant area.

The encryption/decryption engine 143 is a device that decrypts encrypted keys, encrypts keys, decrypts encrypted data, and encrypts data. As the encryption algorithm to be used in the encryption/decryption, the encryption/decryption engine 143 may use an encryption algorithm for the RSA cryptography in the public key cryptography or an encryption algorithm for the AES cryptography in the common key cryptography.

The key storage unit 144 is a device storing the key that is used by the encryption/decryption engine 143.

<Software Structure in Embodiment 1>

Figure 4:
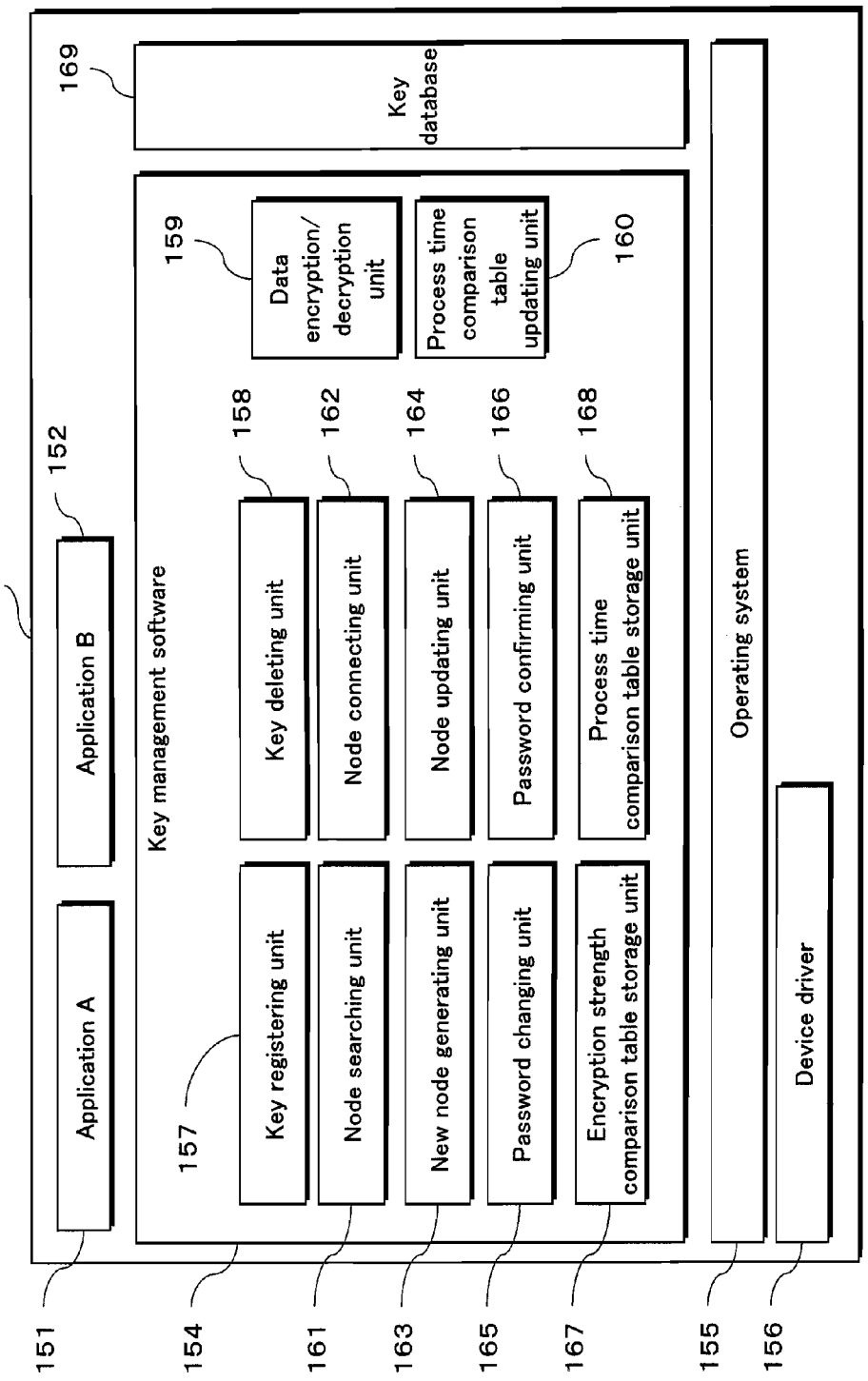
FIG. 4 shows the software structure in Embodiment 1 of the present invention.

FIG. 4 shows the software structure of the data processing device 130 that performs data encryption/decryption by using the key database shown in FIG. 1 and the node information structure shown in FIG. 2.

The structural elements shown in FIG. 4 respectively correspond to the structural elements stored in the memory 132 shown in FIG. 3.

A data processing device 150 includes an application A 151, an application B 152, a key management software 154, an operating system 155, a device driver 156, and a key database 169.

The application A 151 and the application B 152 are the same as the application A 136 and the application B 137 shown in FIG. 3. The application A 151 and the application B 152 provide application functions that are provided by the data processing device 150, such as the communication function based on the TCP/IP, the function to play back copyright-protected music contents, and a service to provide personal information.

The key management software 154 is the same as the key management software 135 shown in FIG. 3. The key management software 154 includes a key registering unit 157, a key deleting unit 158, a data encryption/decryption unit 159, a process time comparison table updating unit 160, a node searching unit 161, a node connecting unit 162, a new node generating unit 163, a node updating unit 164, a password changing unit 165, a password confirming unit 166, an encryption strength comparison table storage unit 167, and a process time comparison table storage unit 168. The functional units constituting the key management software 154 will be described later.

The operating system 155 is the same as the operating system 138 shown in FIG. 3. The operating system 155 performs the scheduling and data communications between the application A 151 and the application B 152.

The device driver 156 is the same as the device driver 139 shown in FIG. 3. The device driver 156 performs the scheduling and data communications between the application A 151 and the application B 152. The device driver 156 provides a function so that the key management software 154 controls the encryption/decryption processing device 134.

<Structural Elements of Key Management Software>

In the following, the functional units constituting the key management software 154 will be described.

The key registering unit 157, upon receiving an instruction from a higher-level application, newly registers a key with a key database 169.

The key deleting unit 158, upon receiving an instruction from a higher-level application, deletes a key from the key database 169.

The data encryption/decryption unit 159, upon receiving an instruction from a higher-level application, encrypts or decrypts data using a key contained in the key database 169 and the encryption/decryption processing device 134.

The process time comparison table updating unit 160, upon receiving an instruction from a higher-level application, updates a process time comparison table stored in the process time comparison table storage unit 168.

The node searching unit 161 searches for a node specified by the key database 169, and searches for a new parent node. Details of the node searching unit 161 will be described later.

The node connecting unit 162 connects a node with the key database 169. Details of the node connecting unit 162 will be described later.

The new node generating unit 163 generates a new node of the key database 169. Details of the new node generating unit 163 will be described later.

The node updating unit 164 changes an encryption algorithm for nodes of the key database 169. Details of the node updating unit 164 will be described later.

The password changing unit 165 changes a password assigned to a new node of the key database 169. Details of the password changing unit 165 will be described later.

The password confirming unit 166 authenticates, using a password, a key managed by the key database 169 when the key is used. Details of the node updating unit 164 will be described later.

The encryption strength comparison table storage unit 167 stores an encryption strength comparison table which will be described later.

The process time comparison table storage unit 168 stores a process time comparison table which will be described later.

<Encryption Strength Comparison Table>

FIG. 5 shows an encryption strength comparison table 170 stored in the encryption strength comparison table storage unit 167.

The encryption strength comparison table 170 includes an encryption algorithm 171, a key length for same security strength-1 172, a key length for same security strength-2 173, a key length for same security strength-3 174, and a key length for same security strength-4 175. It should be noted here that the number of key length for same security strength fields to be included in the encryption strength comparison table 170 may be five or more, or three or less.

The encryption algorithm 171 field stores a list of encryption algorithms for comparison, such as encryption algorithms used in the public key cryptography such as the RSA cryptography and the elliptic curve cryptography, and encryption algorithms used in the common key cryptography such as the AES cryptography and the 3DES cryptography.

The key length for same security strength-1 172 field stores key lengths with which the encryption algorithms stored in the encryption algorithm 171 field have the same security strength, respectively. For example, as shown in FIG. 5, the RSA cryptography with 1024 bits provides the same security strength as the elliptic curve cryptography with 160 bits. Similarly, the RSA cryptography with 1024 bits provides the same security strength as the AES cryptography with 80 bits.

Further, the key length for same security strength-2 173 field stores key lengths with which the encryption algorithms have the same security strength in the case of the RSA cryptography with 2048 bits; the key length for same security strength-3 174 field stores key lengths in the case of the RSA cryptography with 3072 bits; and the key length for same security strength-4 175 field stores key lengths in the case of the RSA cryptography with 7680 bits.

NIST SP 800-57 Recommendation for Key Management, Part 1 pp. 63 (http://csrc.nist.gov/publications/nistpubs/SP800-57-Part1-revised1_Mar08-2007.pdf) discloses security strengths of encryption algorithms compared with each other based on the key lengths.

The key length for same security strength-1 172, the key length for same security strength-2 173, and the key length for same security strength-3 174 may store key lengths that are longer than those corresponding to the same security strength when there are no key lengths that correspond to the same security strength.

<Process Time Comparison Table>

FIG. 6 shows a process time comparison table 180 stored in the process time comparison table storage unit 168.

The process time comparison table 180 includes an encryption/decryption processing device type 181 and process performance comparison among encryption algorithms 182.

The encryption/decryption processing device type 181 stores information for identifying an encryption/decryption processing device. The stored information may be the name or the authentication information of the encryption/decryption processing device.

The process performance comparison among encryption algorithms 182 stores information of process performance of the encryption algorithms for the encryption/decryption processing device identified by the encryption/decryption processing device type 181 field, for comparison. The process performance comparison among encryption algorithms 182 is composed of an encryption algorithm field 183 and comparison information 184.

The encryption algorithm field 183 stores names of: encryption algorithms used in the public key cryptography, such as the RSA cryptography and the elliptic curve cryptography; or encryption algorithms used in the common key cryptography, such as the AES cryptography and the 3DES cryptography.

The comparison information 184 stores process performance for each of the encryption algorithms stored in the encryption algorithm field 183. The stored values may be ranks of the encryption algorithms in terms of the process speed when they perform encryption/decryption, or may be sizes of data which they can process per unit time. In FIG. 6, as one example, the comparison information 184 stores values indicating the ranks in terms of the process speed.

<Operation of Data Processing Device>

Described in the following is the operation of the data processing device. The following description merely concerns the deletion of a key stored in an intermediate node, the registration of a new key, and the update of the process time comparison table. Description of the other processes is omitted since they are similar to those recited in Non-Patent Document 1.

1. Deletion of Key Stored in Intermediate Node by Data Processing Device

Figure 7:
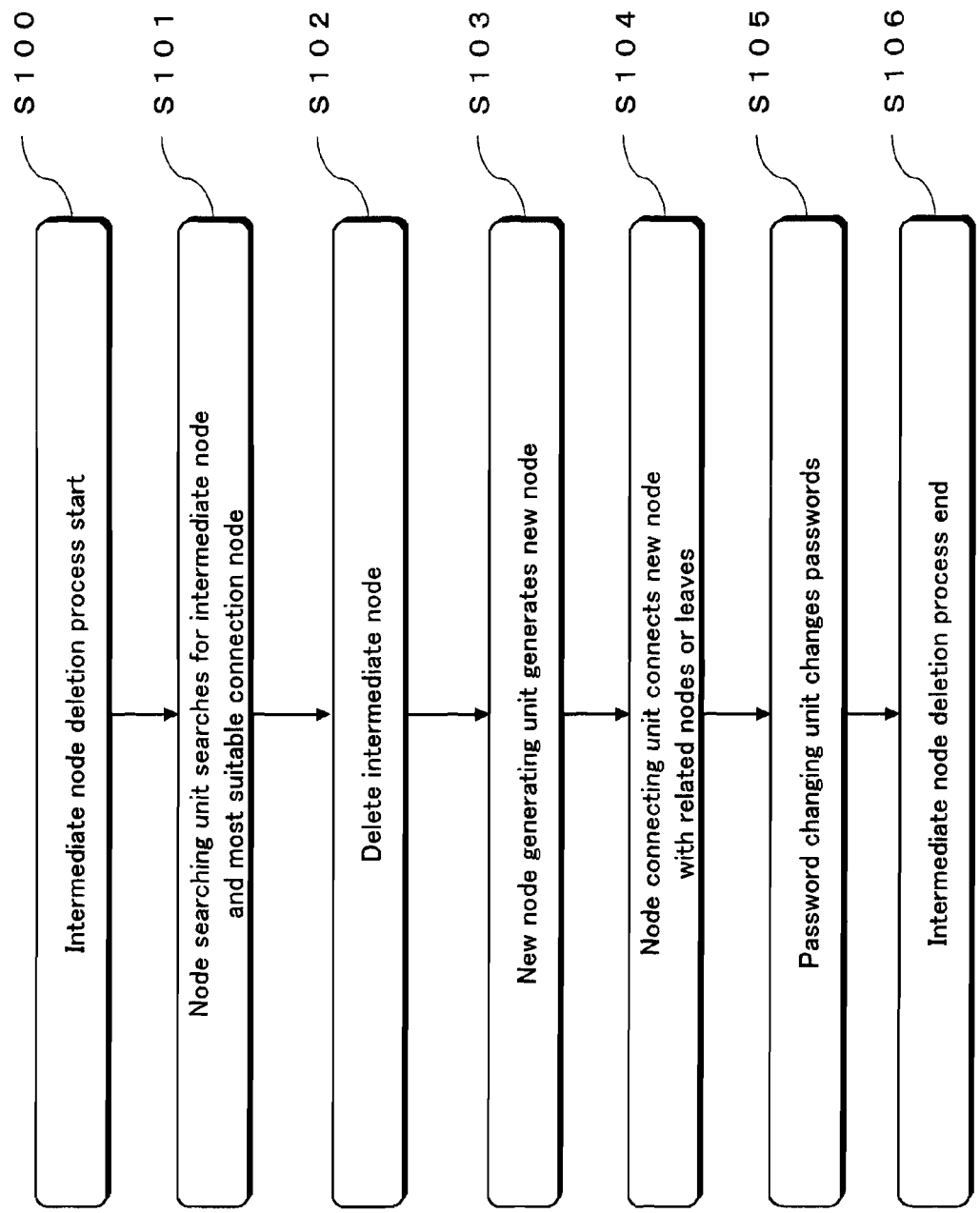
FIG. 7 is sequence diagram showing how a key stored in an intermediate node is deleted in Embodiment 1 of the present invention.

The following will describe how the data processing device 150 deletes a key stored in an intermediate node from the key database 100, with reference to FIG. 7.

A higher-level application sends, to the key management software 154, a request to delete a key, with specification of the key stored in an intermediate node. Upon receiving the request, the key deleting unit 158 starts the intermediate node deletion process (S100).

Instructed by the key deleting unit 158, the node searching unit 161 searches for the intermediate node and a most suitable connection node (S101). The search process will be described later.

Next, the key deleting unit 158 deletes the searched intermediate node (S102).

Next, instructed by the key deleting unit 158, the new node generating unit 163 generates a new node (S103). The generation process will be described later.

Next, instructed by the key deleting unit 158, the node connecting unit 162 connects the new node with related nodes or leaves (S104). The connection process will be described later.

Next, instructed by the key deleting unit 158, the password changing unit 165 changes the passwords of the intermediate nodes or leaves whose connections have been changed (S105). The password change will be described later.

The key deleting unit 158 then ends the intermediate node deletion process (S106).

1.1. Search for Intermediate Node and Most Suitable Connection Node

Figure 8:
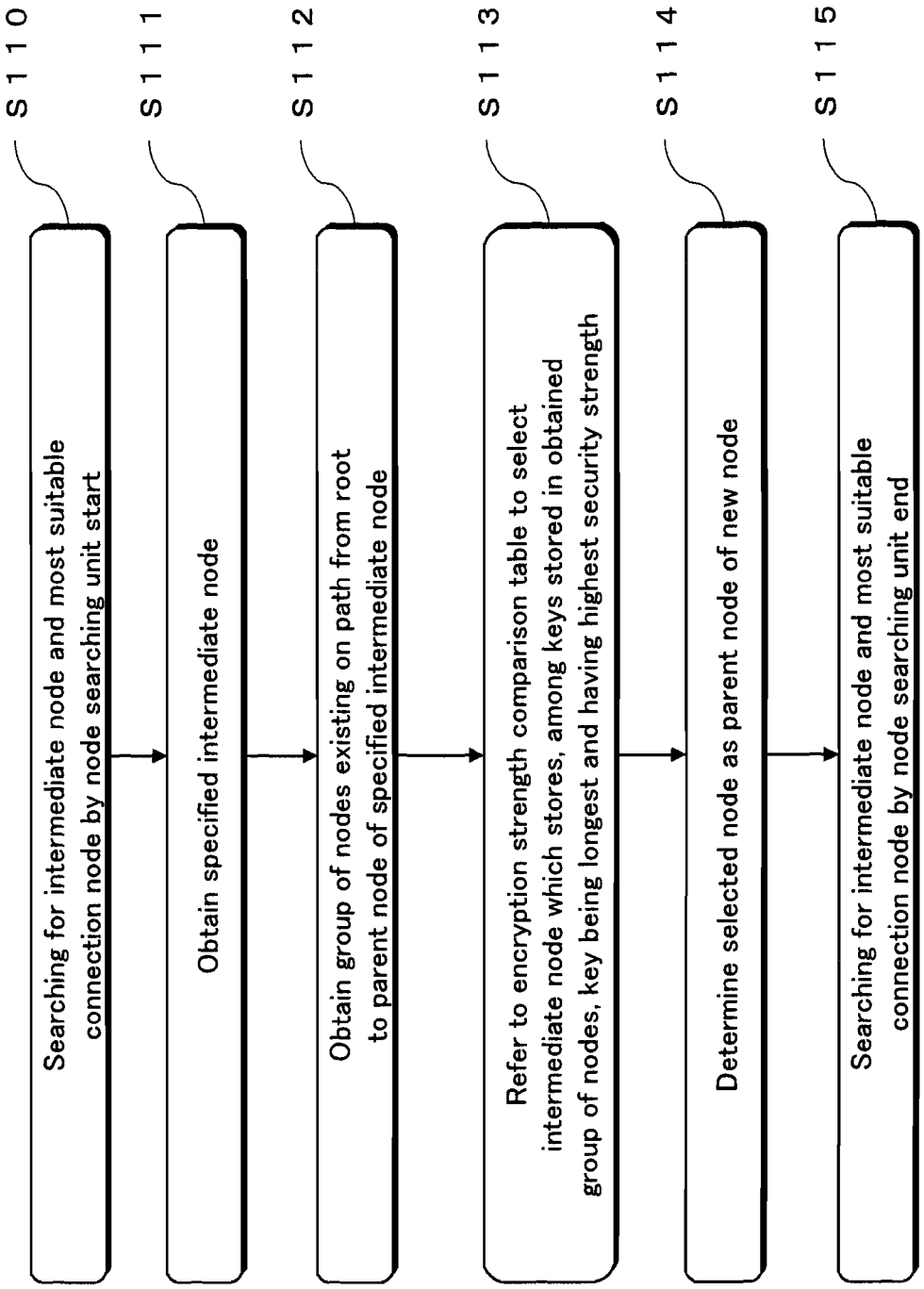
FIG. 8 is sequence diagram showing how an intermediate node and a most suitable connection node are searched in Embodiment 1 of the present invention.

In the following, the process of searching for the intermediate node and most suitable connection node, performed in S101 of FIG. 7, will be described with reference to FIG. 8. FIG. 8 shows details of the process performed in S101 of FIG. 7.

With the control moved to S101 of FIG. 7, the process of searching for the intermediate node and most suitable connection node is started (S110).

The node searching unit 161 searches for a specified intermediate node, from the root to the leaves, and finds the intermediate node (S111). The search of the node can be achieved by using a general-purpose algorithm (for example, the depth first search or the breadth first search) that is used in searching a tree structure, and thus description thereof is omitted.

Next, the node searching unit 161 obtains a group of nodes that exists on a path from the root to the parent node of the specified intermediate node (S112).

Next, the node searching unit 161 selects an intermediate node which stores, among a plurality of keys stored in the obtained group of nodes, a key that is the longest and has the highest security strength. The selection is made based on the encryption strength comparison table 170 (S113).

Next, the intermediate node selected in S113 is determined as a new parent node (S114).

The node searching unit 161 then ends the process of searching for the intermediate node and most suitable connection node (S115).

1.2. Generating New Node

Figure 9:
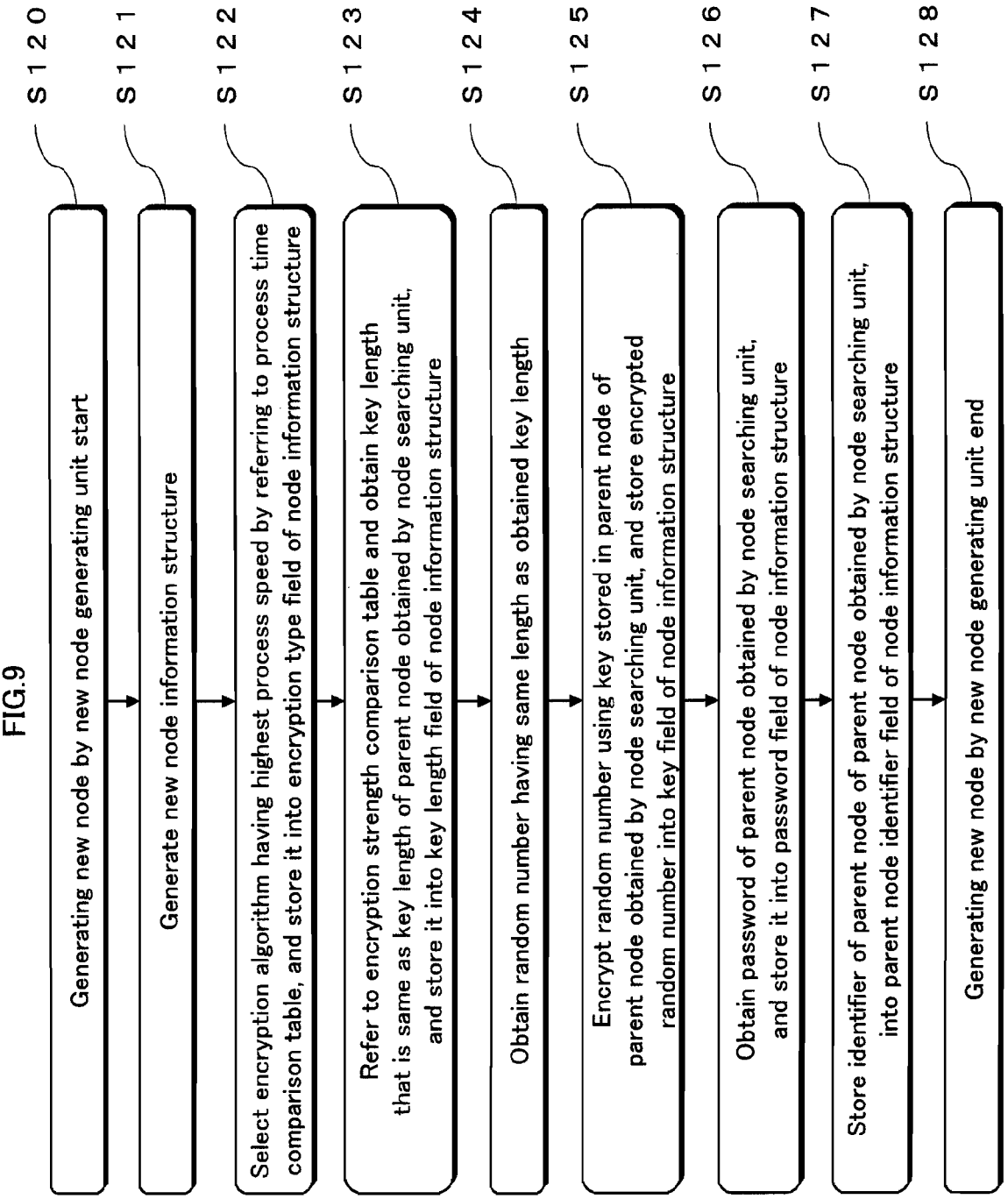
FIG. 9 is sequence diagram showing how a new node is generated in Embodiment 1 of the present invention.

In the following, the process of generating a new node, performed in S103 of FIG. 7, will be described with reference to FIG. 9. FIG. 9 shows details of the process performed in S103 of FIG. 7.

With the control moved to S103 of FIG. 7, the process of generating a new node is started (S120).

The new node generating unit 163 generates a new node information structure 120 (S121).

Next, the new node generating unit 163 selects an encryption algorithm having the highest process speed by referring to the process time comparison table 180, and stores the selected encryption algorithm into the encryption type 121 field of the node information structure 120 (S122).

Next, the new node generating unit 163 refers to the encryption strength comparison table 170 and obtains a key length that is the same as a key length of the parent node obtained by the node searching unit 161 in S101, and stores the obtained key length into the key length 122 field of the node information structure 120 (S123).

Next, the new node generating unit 163 obtains a random number having the same length as the key length obtained in S123 (S124). Here, the random number may be obtained by using a random number generator that is not illustrated, or may be calculated.

Next, the new node generating unit 163 encrypts the random number obtained in S124, by using a key that is stored in a parent node of the parent node obtained in S101, and stores the encrypted random number into the key 123 field of the node information structure 120 (S125). That is to say, the random number is the key to be stored in the new node. For the encryption of the key performed in S125, the encryption/decryption processing device 134 is used.

Next, the new node generating unit 163 obtains a password of the parent node obtained in S101, and stores the password into the password 125 field of the node information structure 120 (S126).

Next, the new node generating unit 163 stores an identifier of the parent node of the parent node obtained in S101, into the parent node identifier 124 field of the node information structure 120 (S127).

The new node generating unit 163 then ends the process of generating a new node (S128).

1.3. Connecting New Node with Related Nodes or Leaves

Figure 10:
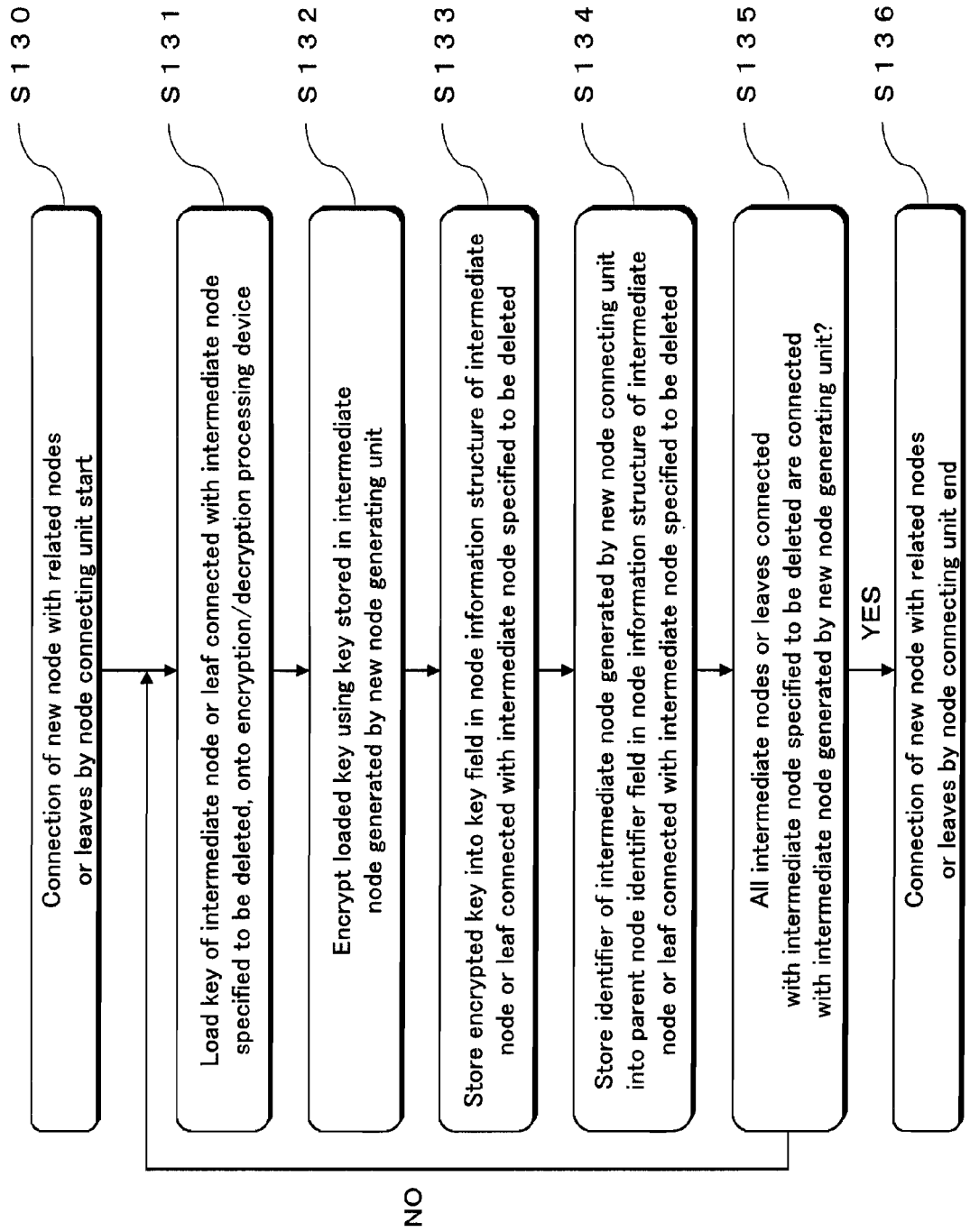
FIG. 10 is sequence diagram showing how a new node is connected with related nodes or leaves in Embodiment 1 of the present invention.

In the following, the process of connecting the new node with related nodes or leaves, performed in S104 of FIG. 7, will be described with reference to FIG. 10.

With the control moved to S104 of FIG. 7, S130 is performed.

Next, the node connecting unit 162 selects an intermediate node or leaf connected with the intermediate node specified to be deleted, and loads a key of the selected node onto the encryption/decryption processing device (S131). Here, the key to be loaded is decrypted by using a key stored in the intermediate node specified to be deleted, before it is loaded.

Next, the node connecting unit 162 encrypts the loaded key using a key stored in the new node generated in S103 (S132).

For the encryption of the key performed in S132, the encryption/decryption processing device 134 is used.

Next, the node connecting unit 162 stores the key encrypted in S132 into the key 123 field in the node information structure 120 of the node selected in S131 (S133).

Next, the node connecting unit 162 stores an identifier of new node generated in S103, into the parent node identifier 124 field in the node information structure 120 of the node selected in S131 (S134).

Next, the node connecting unit 162 confirms whether or not all the intermediate nodes or leaves connected with the intermediate node specified to be deleted are connected with the new node generated in S103 (S135). When all the intermediate nodes or leaves are not connected with the new node, the control moves to S131; and when all the intermediate nodes or leaves are connected with the new node, the control moves to S136.

With the control moved to S136, the node connecting unit 162 ends the process of connecting the new node with related nodes or leaves.

1.4. Password Change

Figure 11:
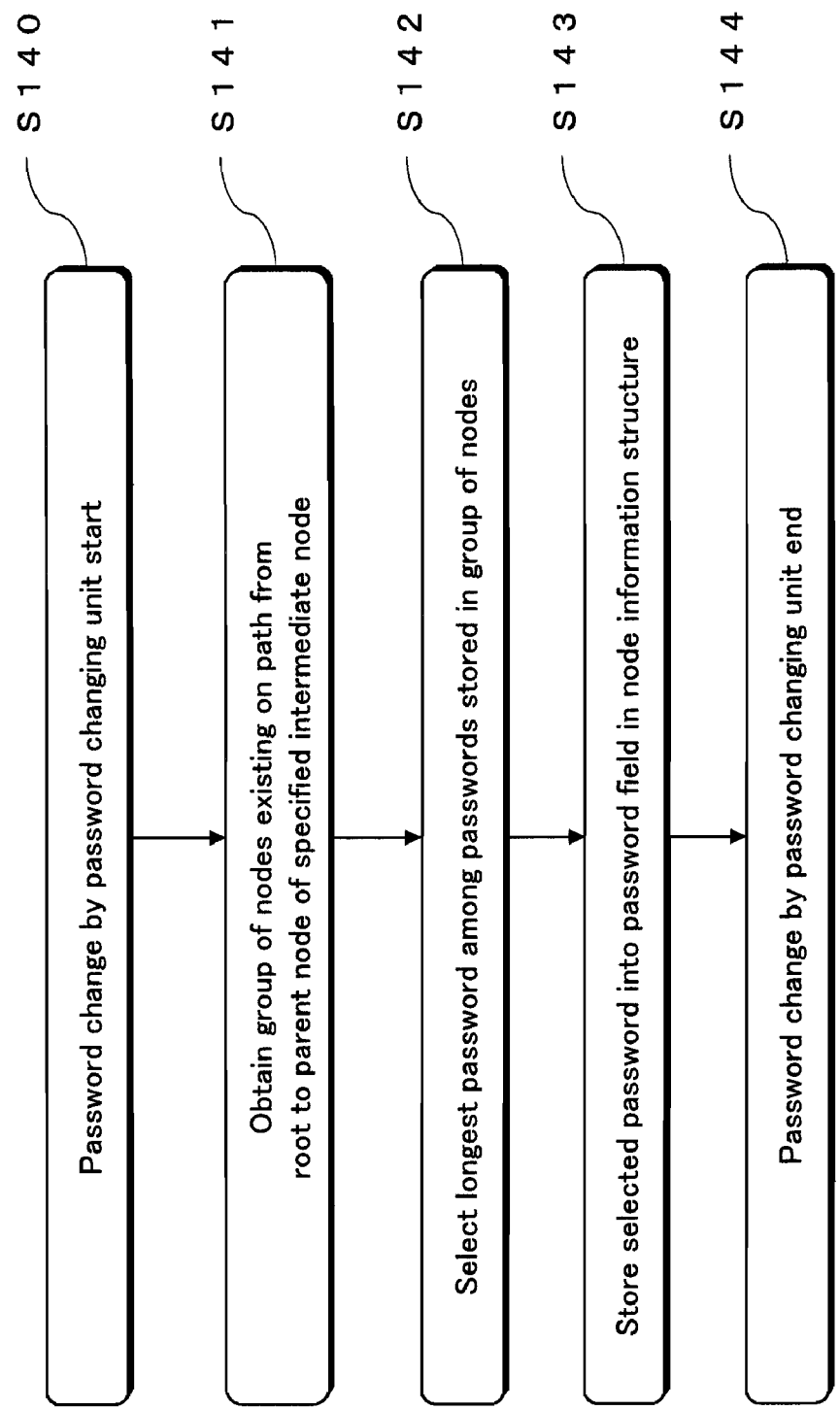
FIG. 11 is sequence diagram showing how a password is changed in Embodiment 1 of the present invention.

In the following, the password change performed in S105 of FIG. 7 will be described with reference to FIG. 11. FIG. 11 shows details of the process performed in S105 of FIG. 7.

With the control moved to S105 of FIG. 7, the password change process is started (S140).

Next, the password changing unit 165 obtains, as a group of nodes, intermediate nodes that exist on a path from the root to the parent node of the intermediate node specified to be deleted (S141).

Next, the password changing unit 165 selects the longest password from among the passwords stored in the group of nodes obtained in S141 (S142).

Next, the password changing unit 165 stores the password selected in S142 into the password 125 field in the node information structure 120 of all the intermediate nodes or leaves newly connected in S104 (S143).

The password changing unit 165 then ends the password change process (S144).

The password selected in S142 may be a combination of all passwords of the group of nodes obtained in S141.

The password selected in S142 may be a predetermined password.

The password selected in S142 may be a combination of a predetermined password and the longest password among the passwords stored in the group of nodes obtained in S141.

1.5 Summary of Key Deletion by Data Processing Device

In the present embodiment, when a key stored in an intermediate node is deleted, the intermediate nodes and leaves connected with the intermediate node are connected with a node which, among the nodes that exist on a path from the root to the parent node of the intermediate node, is the closest to the root and stores the longest key. With this structure, it is possible to reduce the number of times the key loading process is performed, where the key loading process is performed to load, onto the encryption/decryption processing device, the keys to be stored in the intermediate nodes and leaves that are to be connected newly.

Furthermore, in the present embodiment, when a key stored in an intermediate node is deleted, a node is newly generated, where the new node corresponds to a higher-speed encryption algorithm than a newly connected node. And then the generated new node is connected with new intermediate nodes and leaves. With this structure, it is possible to speed up the process of loading, onto the encryption/decryption processing device, the keys to be stored in the intermediate nodes and leaves that are to be connected newly.

2. Registration of Key by Data Processing Device

Figure 12:
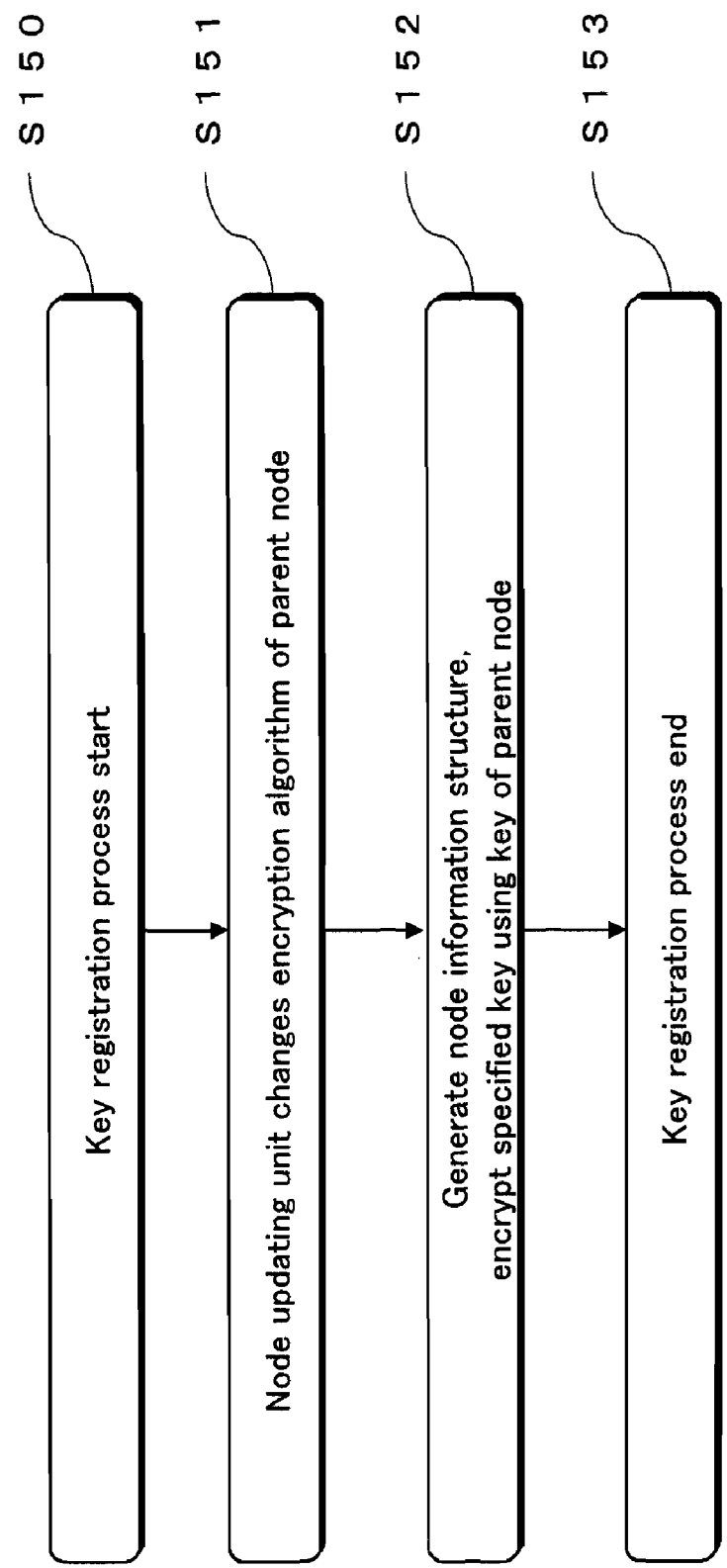
FIG. 12 is sequence diagram showing how the data processing device registers a key in Embodiment 1 of the present invention.

The following will describe the operation where the data processing device 150 newly registers a key with the key database 100, with reference to FIG. 12.

A higher-level application requests the key management software 154 to register a key, with specification of a new key. Upon receiving the key registration request, the key registering unit 157 starts the key registration process (S150). The information specified for the request includes a new key, an encryption type of an encryption in which the new key is used, a key length of the new key, parent node identifier, and a password. As the parent node identifier, an identifier of a node, which is desired to be the parent node of the new key, is specified.

Instructed by the key registering unit 157, the node updating unit 164 changes the encryption algorithm of the parent node indicated by the parent node identifier (S151). When the encryption algorithm is changed, the key stored in the parent node is also changed. The change of the encryption algorithm will be described later.

Next, the key registering unit 157 generates the node information structure 120. Using the key stored in the parent node changed in S151, the key registering unit 157 encrypts the specified key, and stores the encrypted key into the key field of the node information structure 120. Further, the key registering unit 157 store specified values respectively into the fields of the encryption type, key length, parent node identifier, and password (S152). In S152, the key is encrypted using the encryption/decryption processing device 134.

The key registering unit 157 then ends the key registration process (S153).

It should be noted here that the key management software 154 may store a key database that is generated by using the key registration process shown in FIG. 12, and may store a key database that has a tree structure specified by the higher-level application.

When the two databases are stored, the data encryption/decryption unit 159 may select a database between the databases and encrypt/decrypt data by confirming the password which is input when the data is encrypted or decrypted, using the password confirming unit 166.

2.1. Changing Encryption Algorithm of Parent Node

Figure 13:
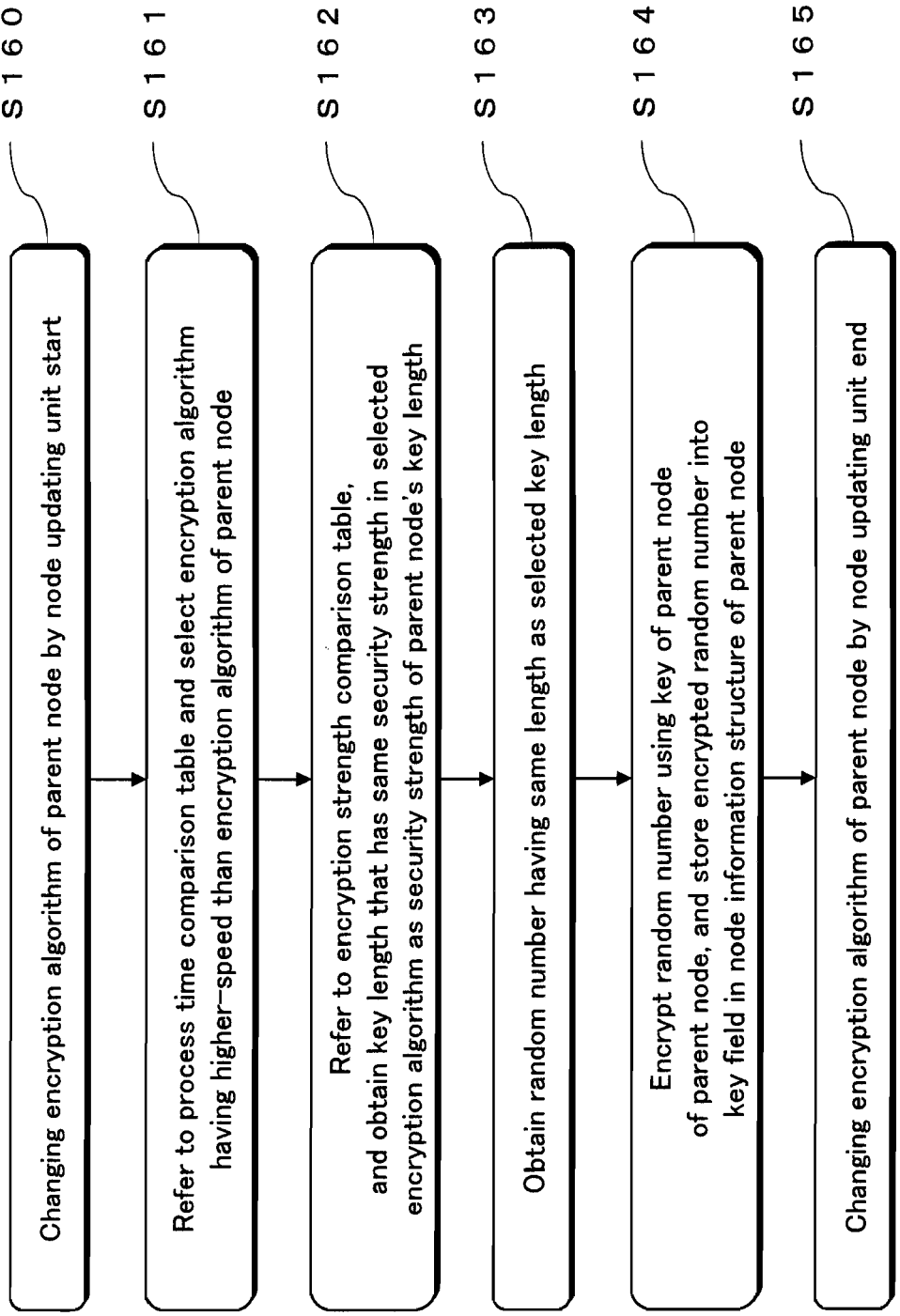
FIG. 13 is sequence diagram showing how the encryption algorithm of the parent node is changed in Embodiment 1 of the present invention.

In the following, the process of changing the encryption algorithm of the parent node, performed in S151 of FIG. 12, will be described with reference to FIG. 13. FIG. 13 shows details of the process performed in S151 of FIG. 12.

With the control moved to S151 of FIG. 12, the process of changing the encryption algorithm of the parent node is started (S160).

Next, the node updating unit 164 refers to the process time comparison table 180 and selects an encryption algorithm that has a higher-speed than the encryption algorithm stored in the node information structure 120 of the parent node (S161).

Next, the node updating unit 164 refers to the encryption strength comparison table 170, and obtains a key length that has the same security strength in the selected encryption algorithm as the security strength of the parent node's key length (S162).

Next, the node updating unit 164 obtains a random number having the same length as the key length obtained in S162 (S163). Here, the random number may be obtained by using a random number generator that is not illustrated, or may be calculated.

Next, the node updating unit 164 encrypts the random number obtained in S163, by using a key that is stored in the parent node specified by the higher-level application, and stores the encrypted random number into the key 123 field in the node information structure 120 of the parent node (S164). That is to say, the generated random number becomes the key of the parent node.

The node updating unit 164 then ends the process of changing the encryption algorithm of the parent node (S165).

2.2. Summary of Key Registration by Data Processing Device

In the present embodiment, when a key is registered, a node is newly generated, where the new node corresponds to a higher-speed encryption algorithm than a newly connected parent node. And then the generated new node is connected with leaves. With this structure, it is possible to speed up the process of loading, onto the encryption/decryption processing device, the keys to be stored in the leaves that are to be connected newly.

3. Updating of Process Time Comparison Table by Data Processing Device

Figure 14:
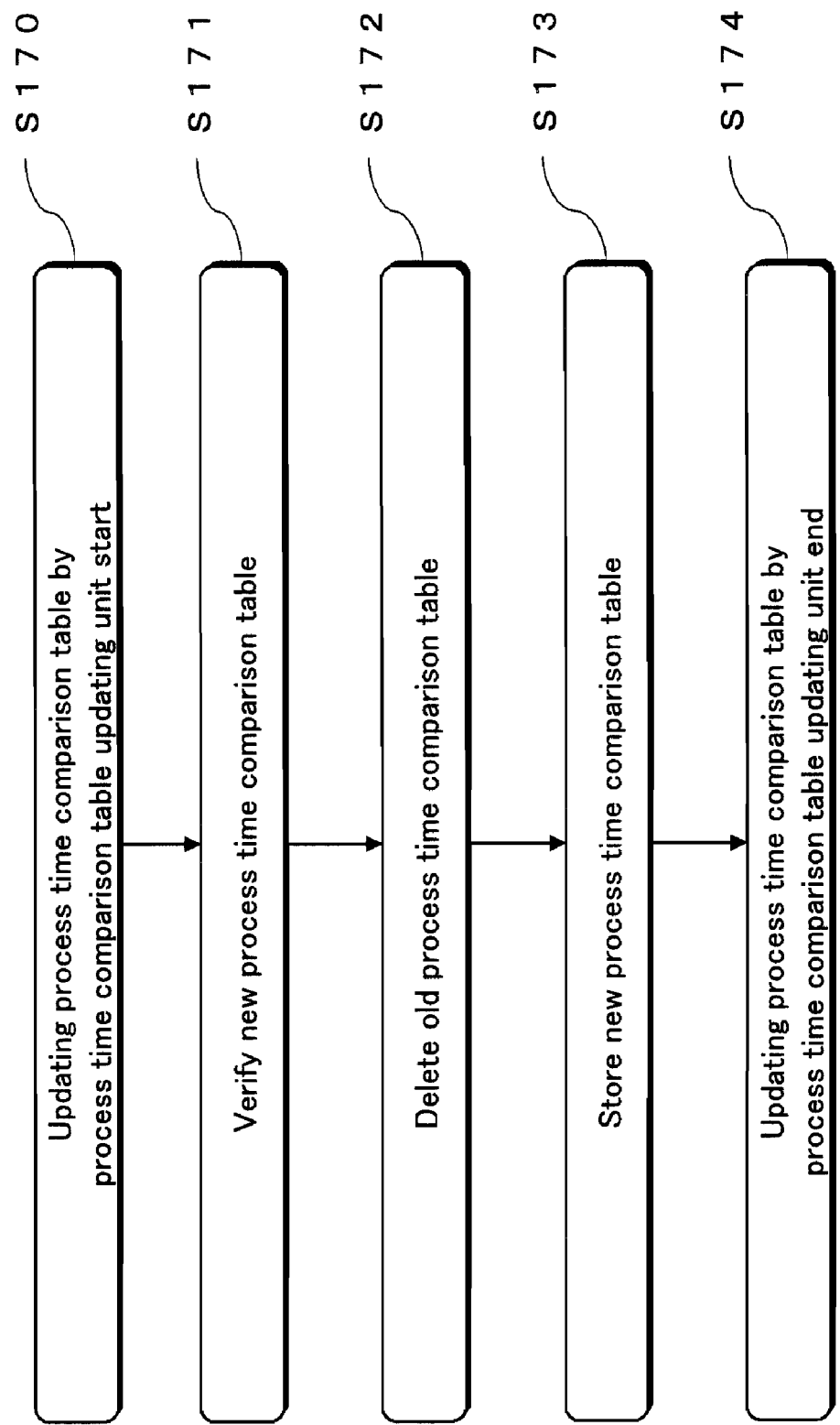
FIG. 14 is sequence diagram showing how the process time comparison table is updated in Embodiment 1 of the present invention.
Figure 15:
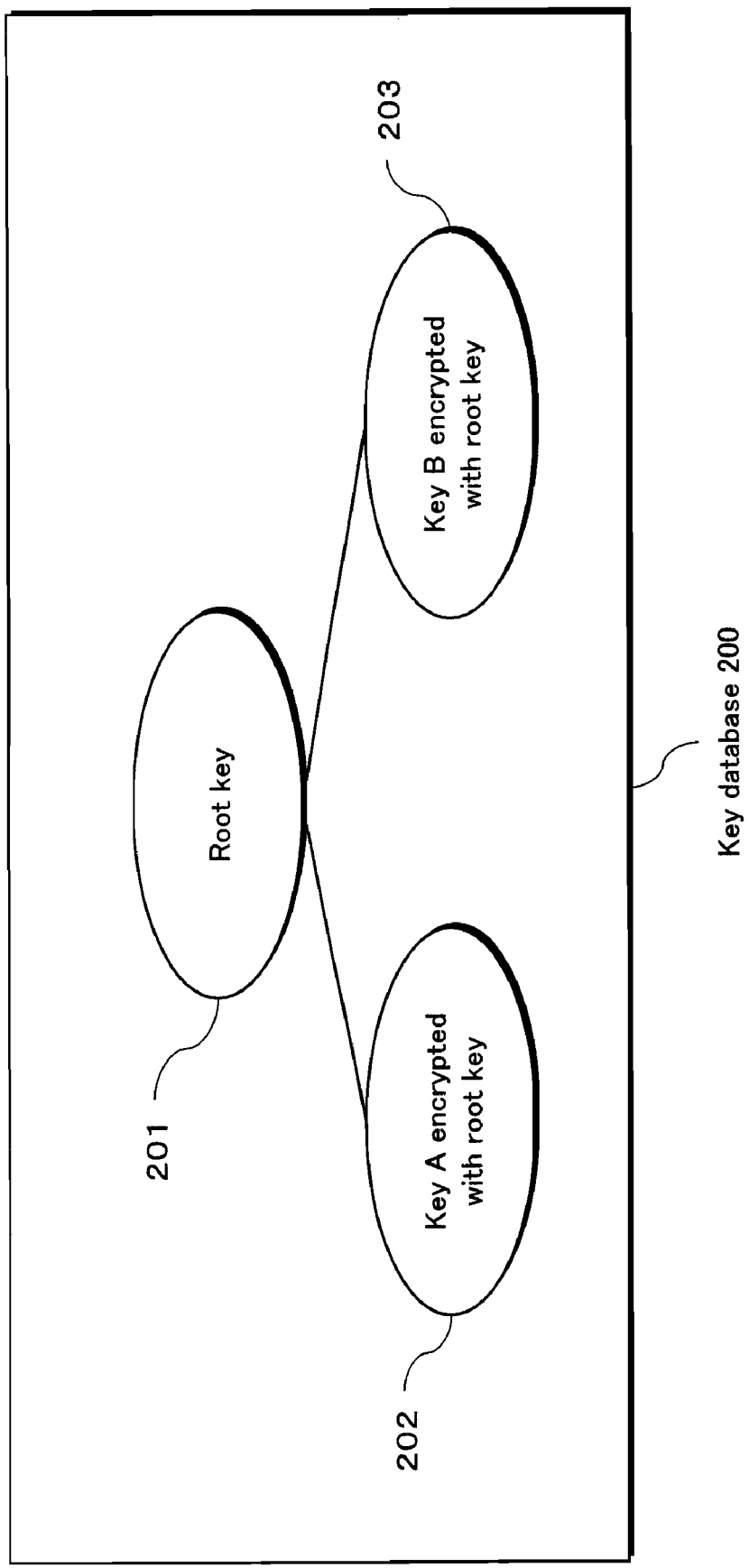
FIG. 15 is a reference drawing showing one example of a key database.
Figure 16:
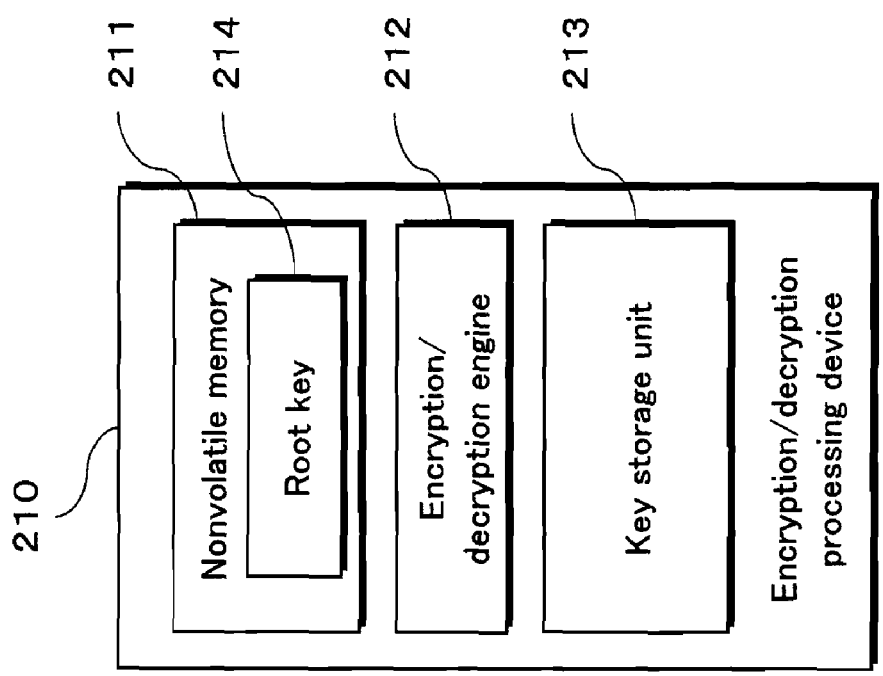
FIG. 16 is a reference drawing showing one example of shows the structure of an encryption/decryption processing device that is used by the key management software to load keys and encrypt and/or decrypt data in Embodiment 1 of the present invention.
Figure 17:
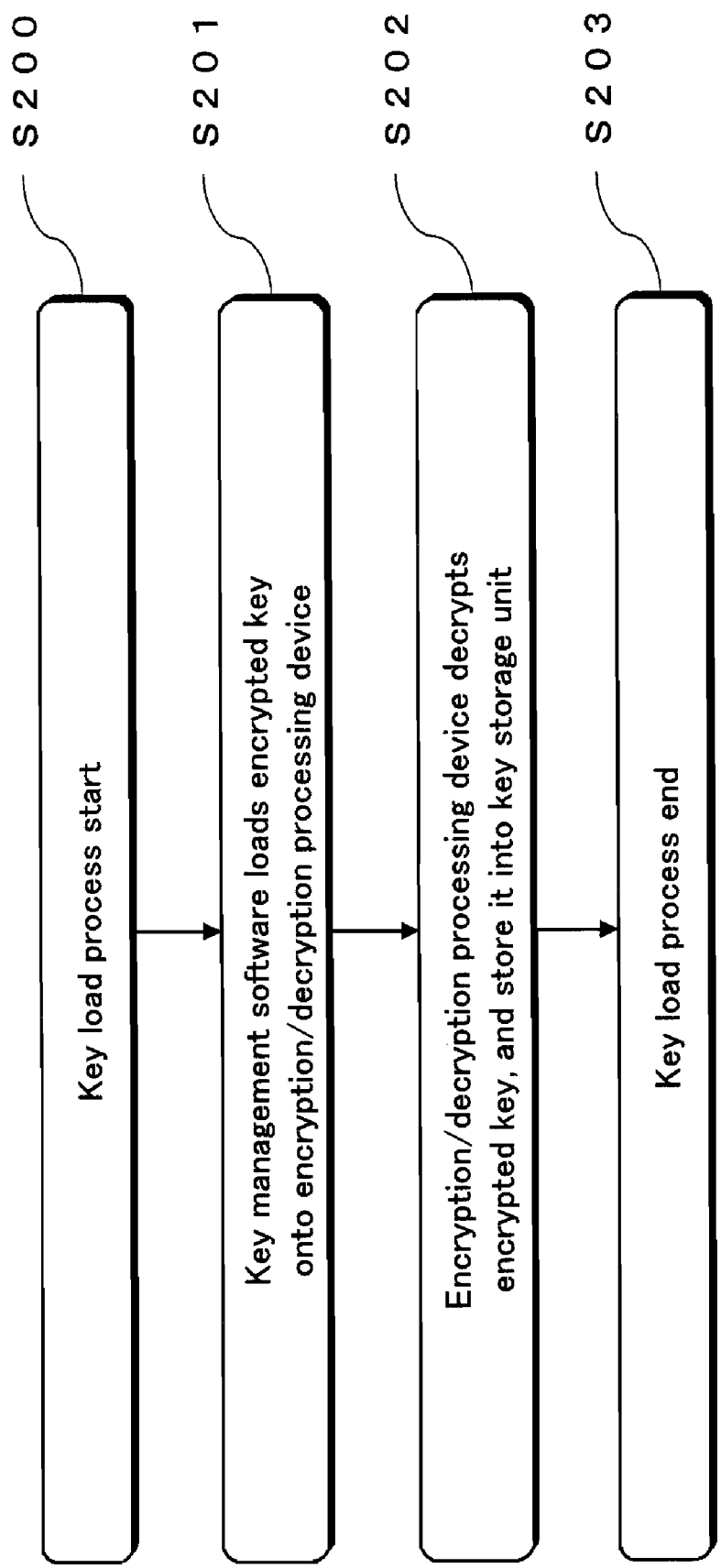
FIG. 17 is a reference drawing showing one example of an encryption/decryption processing device.
Figure 18:
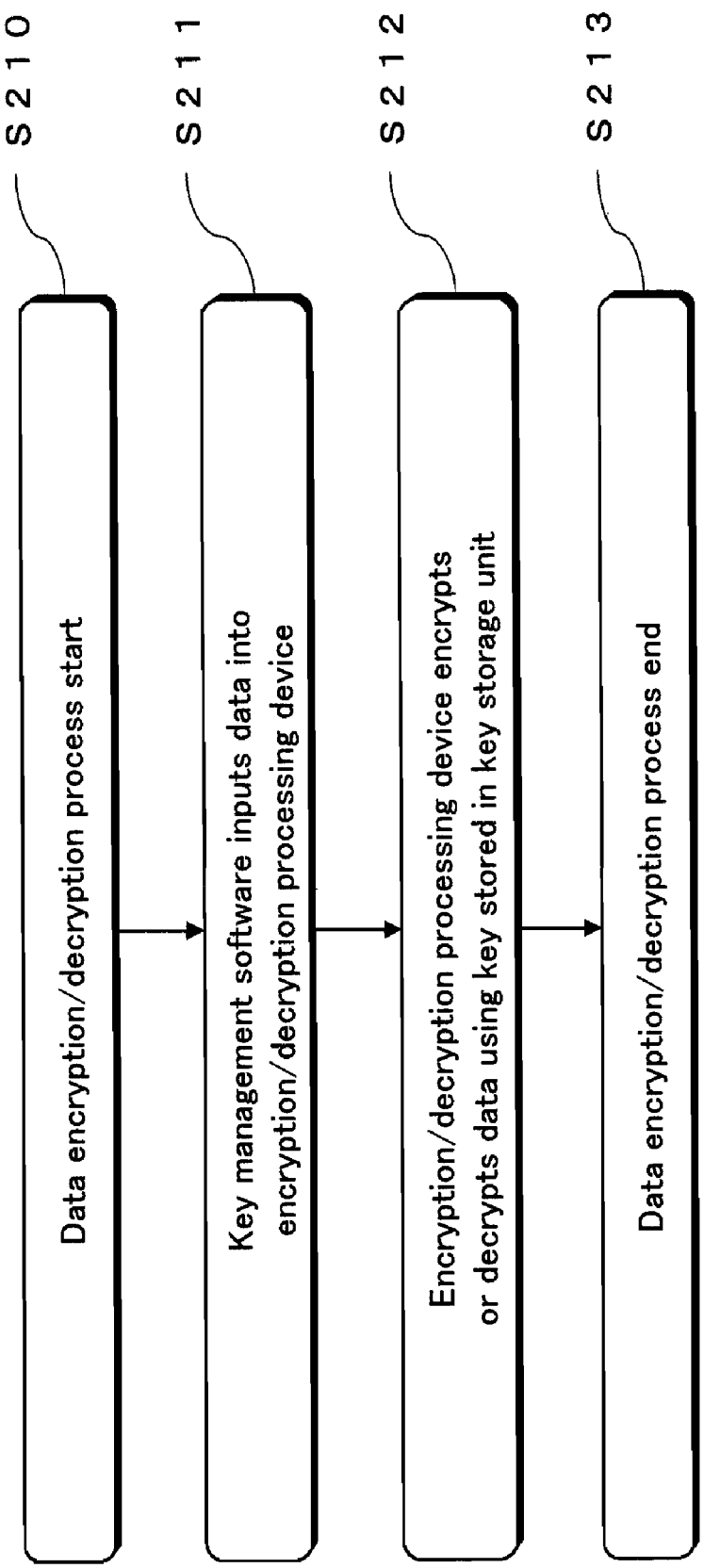
FIG. 18 is a reference drawing showing one example of a data encryption/decryption process.
Figure 19:
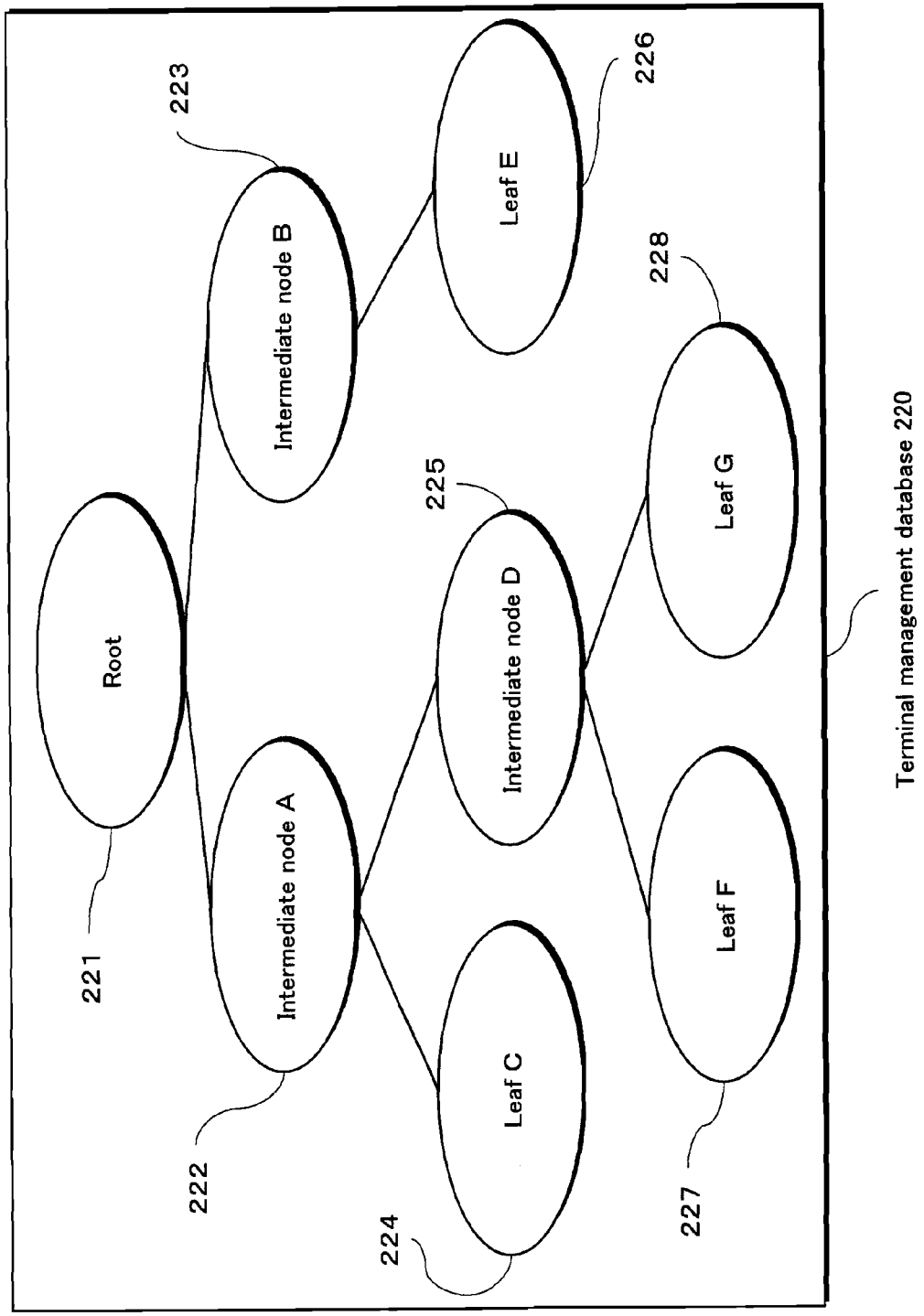
FIG. 19 is a reference drawing showing one example of a terminal management database for managing terminals.

The following will describe the process of updating the process time comparison table 180 by the data processing device 150, with reference to FIG. 14.

A higher-level application requests the key management software 154 to update the process time comparison table, with specification of a new process time comparison table. Upon receiving the request, the process time comparison table updating unit 160 starts the process of updating the process time comparison table (S170).

Next, the process time comparison table updating unit 160 verifies the encryption/decryption processing device type 181 field of the new process time comparison table 180 (S171).

Next, the process time comparison table updating unit 160 deletes the process time comparison table 180 from the process time comparison table storage unit 168 (S172).

Next, the process time comparison table updating unit 160 stores the new process time comparison table 180 into the process time comparison table storage unit 168 (S173).

The process time comparison table updating unit 160 then ends the process of updating the process time comparison table (S174).

In S171, the process time comparison table updating unit 160 may verify the identifier stored in the encryption/decryption processing device type field.

In S171, the process time comparison table updating unit 160 may verify the electronic signature of the process time comparison table that is stored in the encryption/decryption processing device type field.

The deletion of intermediate node performed in S100 may be performed in the defragment process of the key management database.

The other attached information 126 of the node information structure 120 may store a "deleted" flag that indicates that a corresponding intermediate node has been deleted. Further, the "deleted" flag may be set when the higher-level application requests to delete the key stored in the intermediate node, and the key stored in the intermediate node may be actually deleted in the defragment process of the key management database.

<Other Modifications>

(1) In the above-described embodiment, the key database 146 is stored in the memory 132. However, not limited to this, the key database 146 may be stored in the storage device 133.

(2) In the above-described embodiment, in S113, the encryption strength comparison table is referred to, a key having the highest security strength is selected, among a plurality of keys stored in the obtained group of nodes. However, not limited to this, a key having the lowest security strength may be selected. In this case, the key length is the shortest, and thus the process can be sped up.

(3) In the above-described embodiment, the encryption/decryption processing device 134 is achieved by a hardware device. However, it may be achieved by software. Further, the software achieving the encryption/decryption processing device 134 may be executed in a safe software execution environment.

(4) Part or all of structural elements described in the embodiment above may be implemented as software to as much extent as possible. In this case, the amount of hardware contained in the integrated circuit is reduced as much, and thus the integration level is improved.

(5) The structural elements described in the embodiment above may be achieved in one system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

Each part of structural elements constituting each of the above-described devices may be achieved on one chip, or part or all thereof may be achieved on one chip. This case provides a higher process speed than when the structural elements are implemented as software.

(6) Although the term LSI is used here, it may be called IC, LSI, super LSI, ultra LSI or the like, depending on the level of integration. The present invention includes all the cases where the system LSI is achieved with the above-mentioned integration levels, respectively. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(7) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(8) The present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording medium devices.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(9) The present invention may be any combination of the above-described embodiment and modifications.

4. Others (1) A data processing device provided by the present invention comprises: a key database for managing, in a tree structure, keys each of which is used for data encryptions and decryptions, where an encrypted key is generated by encrypting a key using a key stored in a parent node and the generated encrypted key is held by a child node; an encryption/decryption processing device for performing encryptions and decryptions of data and keys; and a key management software for performing encryptions and decryptions of data using the key database and the encryption/decryption processing device, wherein the key management software includes a key delete unit, and the key delete unit includes: a node search sub-unit for, upon receiving from a higher-level application a request to delete a node from the tree structure, newly determining a parent node by referring to an encryption strength comparison table and a process time comparison table; a new node generating sub-unit for newly generating a node that has a security strength equal to or higher than a security strength of the node searched by the node search sub-unit; and a node connecting sub-unit for connecting the node generated by the new node generating sub-unit with a group of nodes that are connected with the node requested to be deleted.

The encryption/decryption processing device may further store a key that corresponds to the root of the tree structure in the key database.

With these structures, the data processing device of the present invention performs encryptions and decryptions of data while protecting the keys from being stolen.

Also, with these structures, the data processing device of the present invention adds and deletes keys flexibly by changing part of the nodes constituting the key structure.

(2) The key database may further store passwords into the nodes, the key management software may include a password changing unit for determining a password for the node newly generated by the new node generating sub-unit, and the password changing unit further selects a longest password among a plurality of passwords stored in all of nodes that exist on a path from the node requested to be deleted to the root.

With the above-described structure, the data processing device of the present invention can permit only a specific user or application to use a key, by using the password for protection.

(3) The encryption strength comparison table may hold, for comparison, values of security strengths respectively of a plurality of encryption algorithms for each of a plurality of different key lengths, and the process time comparison table may hold, for comparison by the encryption/decryption processing device, values of process times respectively required for processing the plurality of encryption algorithms, wherein the node search sub-unit further refers to the encryption strength comparison table and selects, among a plurality of keys stored in all of nodes on a path from the node requested to be deleted to the root, a node that has a longest key and is shortest in depth of tree structure, and the new node generating sub-unit further refers to the process time comparison table and changes a key length and an encryption algorithm so as to correspond to a key length and an encryption algorithm stored in the node specified by the node search sub-unit, and so as to have a shortest process time.

With the above-described structure, the data processing device of the present invention can change the tree structure without decreasing the security strength.

Also, with the above-described structure, the data processing device of the present invention can shorten the depth from the root to leaves and reduce the number of keys to be loaded onto the encryption/decryption processing device for the data encryption/decryption, without decreasing the security strength.

(4) The process time comparison table may further be updated.

With the above-described structure, the data processing device of the present invention can refer to the process time comparison table that corresponds to the encryption/decryption processing device.

(5) A data processing device comprising: a key database for managing, in a tree structure, keys each of which is used for data encryptions and decryptions, where an encrypted key is generated by encrypting a key using a key stored in a parent node and the generated encrypted key is held by a child node; an encryption/decryption processing device for performing encryptions and decryptions of data and keys; and a key management software for performing encryptions and decryptions of data using the key database and the encryption/decryption processing device, wherein the key management software includes a key adding unit, and the key adding unit includes a node changing sub-unit for, upon receiving from a higher-level application a request to add a node to the tree structure, referring to an encryption strength comparison table and a process time comparison table and connecting a requested node to a parent node whose encryption algorithm and key length have been changed by a node changing unit, wherein the encryption/decryption processing device further stores a key corresponding to a root of the key structure in the key database.

With this structure, the data processing device of the present invention performs encryptions and decryptions of data while protecting the keys from being stolen.

Also, with this structure, the data processing device of the present invention adds and deletes keys flexibly by changing part of the nodes constituting the key structure.

(6) The encryption strength comparison table may hold, for comparison, values of security strengths respectively of a plurality of encryption algorithms for each of a plurality of different key lengths, and the process time comparison table may hold, for comparison by the encryption/decryption processing device, values of process times respectively required for processing the plurality of encryption algorithms, wherein the node changing unit further refers to the process time comparison table and changes a key length and an encryption algorithm so as to correspond to a key length and an encryption algorithm stored in the parent node, and so as to have a shortest process time.

With the above-described structure, the data processing device of the present invention can change the encryption algorithms assigned to the nodes on a path from the root to the leaves so that the encryption algorithms can be performed at high speeds by the encryption/decryption processing device, without decreasing the security strength.

(7) A key management device provided by the present invention comprises: a database storage unit storing a key database for managing, in a tree structure, pairs of type information and a key, the type information indicating a type of an encryption algorithm, the key being used in an encryption by the encryption algorithm in a same pair; a strength information storage unit storing strength information that indicates strengths of encryptions that are each performed using a key by an encryption algorithm, the strength information being composed of type information and key information, each piece of type information indicating a type of encryption algorithm, and each piece of key information relating to a key used for encryption, the strength information being structured such that each of the strengths of encryptions corresponds to a piece of type information and a piece of key information; a process time storage unit storing process time information that indicates process times of encryptions respectively by the plurality of encryption algorithms using the corresponding keys; a restructuring unit operable to, upon receiving a specification of a node selected from a plurality of nodes constituting the tree structure, restructure the tree structure, wherein a pair of type information and a key assigned to any node in the key structure corresponds to an encryption algorithm that is used to encrypt and decrypt a key assigned to a child node of said any node, a key assigned to any node except for a root of the key structure has been encrypted using a key and an encryption algorithm of a type that have been assigned to a parent node of said any node, and is stored in the key database in an encrypted state, and the restructuring unit includes: a determining sub-unit operable to, by referring to the strength information and the process time information, determine, for each of nodes on a path from the root of the tree structure to the specified node, a pair of type information and a key that indicates an encryption algorithm having (i) an encryption strength equal to or higher than an encryption strength of an encryption performed by using a key and an encryption algorithm indicated by type information assigned to the node itself and (ii) a shorter process time than a process time of the encryption performed by using the key and the encryption algorithm indicated by the type information assigned to the node itself; a substituting sub-unit operable to substitute each pair of type information and a key, which has been assigned to the nodes on the path from the root of the tree structure to the specified node, with a pair of type information and a key that has been determined by the determining sub-unit on a one-to-one correspondence; and an encrypting sub-unit operable to encrypt each key that has been substituted by the substituting sub-unit, using a key aid an encryption algorithm indicated by type information assigned to a parent node of a node assigned with the substituted key.

(8) The key management device recited in (7) above may further store a key database that has a tree structure dedicated to a predetermined application, wherein the key management device further comprises: a receiving unit operable to receive a specification of a key to be read out, from an application that performs an encryption/decryption process using a pair of a key and an encryption algorithm indicated by a piece of type information managed by the key management device; and a reading unit operable to read out the specified key from the key database as specified by the application, wherein when the application specifies a key structure that should be used for reading out the key, as well as specifying the key, the reading unit reads out the specified key from a key database that has the specified key structure.

(9) In the key database of the key management device recited in (8) above, the restructured key database and the key database that has a tree structure dedicated to a predetermined application may be assigned with different passwords, and the reading unit may judge whether the application specifies a tree structure that should be used for reading out the specified key, by comparing a password supplied from the application with a password assigned to each of the tree structures.

(10) The key management device recited in (7) may further comprise a receiving unit operable to receive a specification of a node to be added newly to the tree structure, wherein the specified node is specified to be added as a child node of the new node, and the encrypting sub-unit may encrypt a key assigned to the new node, by using a key and an encryption algorithm indicated by type information assigned to the specified node.

5. Industrial Applicability

The method of executing the data encryption/decryption by the key management software having the tree structure of the present invention produce an advantageous effect that the tree structure is reduced in depth when a key is deleted or added, since the tree structure is changed while the security strength is maintained. This technology is especially effective in the field of machines for performing data encryption/decryption at high speeds.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A key management device comprising
one or more hardware processors including:
a database storage unit storing a key database for managing, in a tree structure, pairs of type information and a key, wherein (i) the type information indicates a type of an encryption algorithm, and (ii) the key is used in an encryption by the encryption algorithm in a same pair;
a strength information storage unit storing strength information that indicates strengths of encryptions that are each performed using a key by an encryption algorithm, wherein (i) the strength information is composed of type information and key information, (ii) each piece of type information indicates a type of encryption algorithm, (iii) each piece of key information relates to a key used for encryption, and (iv) the strength information is structured such that each of the strengths of encryptions corresponds to a piece of type information and a piece of key information;
a restructuring unit operable to, upon receiving an instruction for restructuring the key database, restructure the key database by positionally changing a change target node that is a node to be changed by the restructuring,
wherein a pair of type information and a key assigned to any node in the tree structure corresponds to an encryption algorithm that is used to encrypt and decrypt a key assigned to a child node of the any node in the tree structure,
wherein a key assigned to any node except for a root of the tree structure has been encrypted using a key and an encryption algorithm of a type that have been assigned to a parent node of the any node except for the root of the tree structure, and is stored in the key database in an encrypted state, and
wherein the restructuring unit includes:
a searching sub-unit operable to, by referring to the strength information, search for, as a candidate node, a node to which has been assigned a pair of type information and a key that corresponds to an encryption algorithm having a highest encryption strength among nodes on a path from the root of the tree structure to the change target node;

a node obtaining sub-unit operable to, by referring to the strength information, obtain, as a substitute candidate node, a node which has a same parent node as the candidate node, and to which has been assigned a pair of type information and a key having an encryption strength equal to or higher than the encryption strength of the candidate node;

a restructuring sub-unit operable to restructure the tree structure so that the change target node becomes a child node of the substitute candidate node; and a re-encrypting sub-unit operable to decrypt a key assigned to the change target node using a key and an encryption algorithm indicated by type information assigned to a node that is a parent node of the change target node before the restructuring is performed, and to re-encrypt the decrypted key using a key and an encryption algorithm indicated by type information assigned to a substitute candidate node that is a parent node of the change target node after the restructuring is performed.

2. The key management device of claim 1,
wherein the one or more hardware processors further include
a process time storage unit storing process time information that indicates process times of encryptions respectively by the plurality of encryption algorithms using the corresponding keys, and
wherein the node obtaining sub-unit refers to the process time information and further obtains, as a substitute candidate node, a node to which has been assigned a pair of type information and a key that corresponds to an encryption algorithm having a shorter process time than a process time of an encryption performed by using a key and an encryption algorithm indicated by type information assigned to the candidate node.

3. The key management device of claim 2,
wherein the node obtaining sub-unit refers to the strength information and the process time information, determines a pair of a key and type information that indicates an encryption algorithm having (i) an encryption strength equal to or higher than an encryption strength of the encryption performed by using the key and the encryption algorithm indicated by the type information assigned to the candidate node and (ii) a shorter process time than the process time of the encryption performed by using the key and the encryption algorithm indicated by the type information assigned to the candidate node, newly generates a node, assigns the determined pair of a key and type information to the newly generated node, and determines the newly generated node as the substitute candidate node,
wherein the restructuring sub-unit adds the substitute candidate node as a child node of a node that is a parent node of the candidate node, and restructures the tree structure so that the change target node becomes a child node of the substitute candidate node, and
wherein the re-encrypting sub-unit encrypts a key assigned to the substitute candidate node using a key and an encryption algorithm indicated by type information assigned to a node that is a parent node of the candidate node.

4. The key management device of claim 3,
wherein the strength information storage unit stores an encryption strength comparison table in which key lengths of keys used in the encryptions are used as the key information, and wherein the encryption strength comparison table includes, as the strength information, a plurality of sets of key lengths with which the plurality of encryption algorithms have a same security strength, respectively.

5. The key management device of claim 1,
wherein the instruction for restructuring received by the restructuring unit is an instruction for deleting a node from the tree structure, and
wherein the change target node is a child node of the node specified by the node delete instruction.

6. The key management device of claim 1,
wherein each node in the tree structure is assigned with a password that is required to use a corresponding key, and
wherein the restructuring unit further includes:
a password obtaining sub-unit operable to obtain a password that is longest among passwords respectively assigned to nodes present on a path from the root of the tree structure to the change target node; and
an assigning sub-unit operable to assign the obtained password to the change target node.

7. A key management device comprising
one or more hardware processors including:
a database storage unit storing a key database for managing, in a tree structure, pairs of type information and a key, wherein (i) the type information indicates a type of an encryption algorithm, and (ii) the key is used in an encryption by the encryption algorithm;
a strength information storage unit storing strength information that indicates strengths of encryptions that are each performed using a key by an encryption algorithm, wherein (i) the strength information is composed of type information and key information, (ii) each piece of type information indicates a type of encryption algorithm, (iii) each piece of key information relates to a key used for encryption, and (iv) the strength information is structured such that each of the strengths of encryptions corresponds to a piece of type information and a piece of key information; and
a restructuring unit operable to, upon receiving an instruction for restructuring the key database, restructure the key database by positionally changing a change target node that is a node being a target of change by the restructuring,
wherein a pair of type information and a key assigned to any node in the tree structure corresponds to an encryption algorithm that is used for encrypting and decrypting a key assigned to a child node of the any node in the tree structure,
wherein a key assigned to any node except for a root of the tree structure has been encrypted using a key and an encryption algorithm of a type that have been assigned to a parent node of the any node except for the root of the tree structure, and is stored in the key database in an encrypted state, and
wherein the restructuring unit includes:
a searching sub-unit operable to, by referring to the strength information, search for, as a candidate node, a node to which has been assigned a pair of type information and a key that corresponds to an encryption algorithm having a highest encryption strength on a path from the root of the tree structure to the change target node;

a restructuring sub-unit operable to, by referring to the strength information, restructure the tree structure so that the change target node becomes a child node of the candidate node; and a re-encrypting sub-unit operable to decrypt a key assigned to the change target node using a key and an encryption algorithm indicated by type information assigned to a node that is a parent node of the change target node before the restructuring is performed, and to re-encrypt the decrypted key using a key and an encryption algorithm indicated by type information assigned to a candidate node that is a parent node of the change target node after the restructuring is performed.

8. A key management method for use in a key management device, wherein the key management device includes one or more hardware processors including:
  a database storage unit storing a key database for managing, in a tree structure, pairs of type information and a key, wherein (i) the type information indicates indicating a type of an encryption algorithm, and (ii) the key being used in an encryption by the encryption algorithm; and
  a strength information storage unit storing strength information that indicates strengths of encryptions that are each performed using a key by an encryption algorithm, wherein (i) the strength information is composed of type information and key information, (ii) each piece of type information indicates a type of encryption algorithm, (iii) each piece of key information relates to a key used for encryption, and (iv) the strength information is structured such that each of the strengths of encryptions corresponds to a piece of type information and a piece of key information, wherein a pair of type information and a key assigned to any node in the tree structure corresponds to an encryption algorithm that is used for encrypting and decrypting a key assigned to a child node of the any node in the tree structure, and wherein a key assigned to any node except for a root of the tree structure has been encrypted using a key and an encryption algorithm of a type that have been assigned to a parent node of the any node except for the root of the tree structure, and is stored in the key database in an encrypted state, the key management method comprising
a step of, upon receiving an instruction for restructuring the key database, restructuring the key database by positionally changing a change target node that is a node being a target of change by the restructuring,
wherein the restructuring step includes sub-steps of:
  searching for, as a candidate node, a node to which has been assigned a pair of type information and a key that correspond to an encryption algorithm having a highest encryption strength on a path from the root of the tree structure to the change target node, by referring to the strength information;
  obtaining, as a substitute candidate node, a node to which has been assigned a pair of type information and a key that corresponds to an encryption algorithm having a same parent node as the candidate node and having an encryption strength equal to or higher than the encryption strength of the candidate node, by referring to the strength information;

restructuring the tree structure so that the change target node becomes a child node of the substitute candidate node; and decrypting a key assigned to the change target node using a key and an encryption algorithm indicated by type information assigned to a node that is a parent node of the change target node before the restructuring is performed, and re-encrypting the decrypted key using a key and an encryption algorithm indicated by type information assigned to a substitute candidate node that is a parent node of the change target node after the restructuring is performed.

9. A non-transitory computer readable recording medium storing a key management program for use in a key management device, wherein the key management device includes one or more hardware processors including:
  a database storage unit storing a key database for managing, in a tree structure, pairs of type information and a key, wherein (i) the type information indicates a type of an encryption algorithm, and (ii) the key is used in an encryption by the encryption algorithm; and
  a strength information storage unit storing strength information that indicates strengths of encryptions that are each performed using a key by an encryption algorithm, wherein (i) the strength information is composed of type information and key information, (ii) each piece of type information indicates a type of encryption algorithm, (iii) each piece of key information relates to a key used for encryption, and (iv) the strength information is structured such that each of the strengths of encryptions corresponds to a piece of type information and a piece of key information, wherein a pair of type information and a key assigned to any node in the tree structure corresponds to an encryption algorithm that is used for encrypting and decrypting a key assigned to a child node of the any node in the tree structure, wherein a key assigned to any node except for a root of the tree structure has been encrypted using a key and an encryption algorithm of a type that have been assigned to a parent node of the any node except for the root of the tree structure, and is stored in the key database in an encrypted state, and wherein, when executed, the key management program causes the key management device to perform a method comprising a step of, upon receiving an instruction for restructuring the key database, restructuring the key database by positionally changing a change target node that is a node being a target of change by the restructuring, wherein the restructuring step includes sub-steps of:
  searching for, as a candidate node, a node to which has been assigned a pair of type information and a key that correspond to an encryption algorithm having a highest encryption strength on a path from the root of the tree structure to the change target node, by referring to the strength information;
  obtaining, as a substitute candidate node, a node to which has been assigned a pair of type information and a key that corresponds to an encryption algorithm having a same parent node as the candidate node and having an encryption strength equal to or higher than the encryption strength of the candidate node, by referring to the strength information;

restructuring the tree structure so that the change target node becomes a child node of the substitute candidate node; and decrypting a key assigned to the change target node using a key and an encryption algorithm indicated by type information assigned to a node that is a parent node of the change target node before the restructuring is performed, and re-encrypting the decrypted key using a key and an encryption algorithm indicated by type information assigned to a substitute candidate node that is a parent node of the change target node after the restructuring is performed.

10. An integrated circuit for use in a key management device, the integrated circuit comprising one or more hardware processors including:

a database storage unit storing a key database for managing, in a tree structure, pairs of type information and a key, wherein (i) the type information indicates a type of an encryption algorithm, and (ii) the key is used in an encryption by the encryption algorithm in a same pair;

a strength information storage unit storing strength information that indicates strengths of encryptions that are each performed using a key by an encryption algorithm, wherein (i) the strength information is composed of type information and key information, (ii) each piece of type information indicates a type of encryption algorithm, (iii) each piece of key information relates to a key used for encryption, and (iv) the strength information is structured such that each of the strengths of encryptions corresponds to a piece of type information and a piece of key information;

a restructuring unit operable to, upon receiving an instruction for restructuring the key database, restructure the key database by positionally changing a change target node that is a node to be changed by the restructuring, wherein a pair of type information and a key assigned to any node in the tree structure corresponds to an encryption algorithm that is used to encrypt and decrypt a key assigned to a child node of the any node in the tree structure, wherein a key assigned to any node except for a root of the tree structure has been encrypted using a key and an encryption algorithm of a type that have been assigned to a parent node of the any node except for the root of the tree structure, and is stored in the key database in an encrypted state, and wherein the restructuring unit includes:

a searching sub-unit operable to, by referring to the strength information, search for, as a candidate node, a node to which has been assigned a pair of type information and a key that corresponds to an encryption algorithm having a highest encryption strength among nodes on a path from the root of the tree structure to the change target node;

a node obtaining sub-unit operable to, by referring to the strength information, obtain, as a substitute candidate node, a node which has a same parent node as the candidate node, and to which has been assigned a pair of type information and a key having an encryption strength equal to or higher than the encryption strength of the candidate node;

a restructuring sub-unit operable to restructure the tree structure so that the change target node becomes a child node of the substitute candidate node; and a re-encrypting sub-unit operable to decrypt a key assigned to the change target node using a key and an encryption algorithm indicated by type information assigned to a node that is a parent node of the change target node before the restructuring is performed, and to re-encrypt the decrypted key using a key and an encryption algorithm indicated by type information assigned to a substitute candidate node that is a parent node of the change target node after the restructuring is performed.

11. A key management method for use in a key management device, wherein the key management device includes one or more hardware processors including:

a database storage unit storing a key database for managing, in a tree structure, pairs of type information and a key, wherein (i) the type information indicates a type of an encryption algorithm, and (ii) the key is used in an encryption by the encryption algorithm; and a strength information storage unit storing strength information that indicates strengths of encryptions that are each performed using a key by an encryption algorithm, wherein (i) the strength information is composed of type information and key information, (ii) each piece of type information indicates a type of encryption algorithm, (iii) each piece of key information relates to a key used for encryption, and (iv) the strength information is structured such that each of the strengths of encryptions corresponds to a piece of type information and a piece of key information, wherein a pair of type information and a key assigned to any node in the tree structure corresponds to an encryption algorithm that is used for encrypting and decrypting a key assigned to a child node of the any node in the tree structure, and wherein a key assigned to any node except for a root of the tree structure has been encrypted using a key and an encryption algorithm of a type that have been assigned to a parent node of the any node except for the root of the tree structure, and is stored in the key database in an encrypted state, the key management method comprising a step of restructuring, upon receiving an instruction for restructuring the key database, the key database by positionally changing a change target node that is a node being a target of change by the restructuring, wherein the restructuring step includes sub-steps of:

searching for, as a candidate node, a node to which has been assigned a pair of type information and a key that corresponds to an encryption algorithm having a highest encryption strength on a path from the root of the tree structure to the change target node, by referring to the strength information;

restructuring the tree structure by referring to the strength information so that the change target node becomes a child node of the candidate node; and decrypting a key assigned to the change target node using a key and an encryption algorithm indicated by type information assigned to a node that is a parent node of the change target node before the restructuring is performed, and re-encrypting the decrypted key using a key and an encryption algorithm indicated by type information assigned to a candidate node that is a parent node of the change target node after the restructuring is performed.

12. A non-transitory computer readable recording medium storing a key management program for use in a key management device,
  wherein the key management device includes one or more hardware processors including:
    a database storage unit storing a key database for managing, in a tree structure, pairs of type information and a key, wherein (i) the type information indicates a type of an encryption algorithm, and (ii) the key is used in an encryption by the encryption algorithm; and
    a strength information storage unit storing strength information that indicates strengths of encryptions that are each performed using a key by an encryption algorithm, wherein (i) the strength information is composed of type information and key information, (ii) each piece of type information indicates a type of encryption algorithm, (iii) each piece of key information relates to a key used for encryption, and (iv) the strength information is structured such that each of the strengths of encryptions corresponds to a piece of type information and a piece of key information,
  wherein a pair of type information and a key assigned to any node in the tree structure corresponds to an encryption algorithm that is used for encrypting and decrypting a key assigned to a child node of the any node in the tree structure,
  wherein a key assigned to any node except for a root of the tree structure has been encrypted using a key and an encryption algorithm of a type that have been assigned to a parent node of the any node except for the root of the tree structure, and is stored in the key database in an encrypted state, and
  wherein, when executed, the key management program causes the key management device to perform a method comprising
  a step of restructuring, upon receiving an instruction for restructuring the key database, the key database by positionally changing a change target node that is a node being a target of change by the restructuring,
  wherein the restructuring step includes sub-steps of:
    searching for, as a candidate node, a node to which has been assigned a pair of type information and a key that corresponds to an encryption algorithm having a highest encryption strength on a path from the root of the tree structure to the change target node, by referring to the strength information;
    restructuring the tree structure by referring to the strength information so that the change target node becomes a child node of the candidate node; and
    decrypting a key assigned to the change target node using a key and an encryption algorithm indicated by type information assigned to a node that is a parent node of the change target node before the restructuring is performed, and re-encrypting the decrypted key using a key and an encryption algorithm indicated by type information assigned to a candidate node that is a parent node of the change target node after the restructuring is performed.

13. An integrated circuit for use in a key management device, the integrated circuit comprising
  one or more hardware processors including:
    a database storage unit storing a key database for managing, in a tree structure, pairs of type information and a key, wherein (i) the type information indicates a type of an encryption algorithm, and (ii) the key being used in an encryption by the encryption algorithm;
    a strength information storage unit storing strength information that indicates strengths of encryptions that are each performed using a key by an encryption algorithm, wherein (i) the strength information is composed of type information and key information, (ii) each piece of type information indicates a type of encryption algorithm, (iii) each piece of key information relates to a key used for encryption, and (iv) the strength information is structured such that each of the strengths of encryptions corresponds to a piece of type information and a piece of key information; and
    a restructuring unit operable to, upon receiving an instruction for restructuring the key database, restructure the key database by positionally changing a change target node that is a node being a target of change by the restructuring,
  wherein a pair of type information and a key assigned to any node in the tree structure corresponds to an encryption algorithm that is used for encrypting and decrypting a key assigned to a child node of the any node in the tree structure,
  wherein a key assigned to any node except for a root of the tree structure has been encrypted using a key and an encryption algorithm of a type that have been assigned to a parent node of the any node except for the root of the tree structure, and is stored in the key database in an encrypted state, and
  wherein the restructuring unit includes:
    a searching sub-unit operable to, by referring to the strength information, search for, as a candidate node, a node to which has been assigned a pair of type information and a key that corresponds to an encryption algorithm having a highest encryption strength on a path from the root of the tree structure to the change target node;
    a restructuring sub-unit operable to, by referring to the strength information, restructure the tree structure so that the change target node becomes a child node of the candidate node; and
    a re-encrypting sub-unit operable to decrypt a key assigned to the change target node using a key and an encryption algorithm indicated by type information assigned to a node that is a parent node of the change target node before the restructuring is performed, and to re-encrypt the decrypted key using a key and an encryption algorithm indicated by type information assigned to a candidate node that is a parent node of the change target node after the restructuring is performed.

* * * * *